US010185595B1

(12) United States Patent
Ramatchandirane et al.

(10) Patent No.: US 10,185,595 B1
(45) Date of Patent: Jan. 22, 2019

(54) PROGRAM VERIFICATION USING HASH CHAINS

(71) Applicant: Confia Systems, Inc., Mountain View, CA (US)

(72) Inventors: Nadaradjane Ramatchandirane, Mountain View, CA (US); Vandana Upadhyay, Santa Clara, CA (US)

(73) Assignee: Confia Systems, Inc., Mountain View, CA (US)

( * ) Notice: Subject to any disclaimer, the term of this patent is extended or adjusted under 35 U.S.C. 154(b) by 0 days.

(21) Appl. No.: 15/997,648

(22) Filed: Jun. 4, 2018

(51) Int. Cl.
| | |
|---|---|
| *G06F 9/46* | (2006.01) |
| *G06F 9/50* | (2006.01) |
| *G06F 9/30* | (2018.01) |
| *H04L 9/06* | (2006.01) |
| *G06F 21/60* | (2013.01) |

(52) U.S. Cl.
CPC ........ *G06F 9/5061* (2013.01); *G06F 9/30003* (2013.01); *G06F 21/602* (2013.01); *H04L 9/06* (2013.01); *H04L 2209/38* (2013.01)

(58) Field of Classification Search
CPC . H04L 2209/38; H04L 9/3236; H04L 9/0637; G06F 9/3808
See application file for complete search history.

(56) References Cited

U.S. PATENT DOCUMENTS

| | | | | |
|---|---|---|---|---|
| 7,581,089 B1 * | 8/2009 | White | ................. | G06F 12/1416 712/242 |
| 8,510,596 B1 * | 8/2013 | Gupta | .................. | G06F 11/073 714/15 |
| 2002/0032718 A1 * | 3/2002 | Yates | .................... | G06F 9/4486 718/107 |
| 2004/0143721 A1 * | 7/2004 | Pickett | .................... | G06F 9/383 711/217 |
| 2008/0320247 A1 * | 12/2008 | Morfey | ..................... | G06F 1/24 711/154 |

(Continued)

OTHER PUBLICATIONS

Lee, Blockchain-based secure firmware update for embedded devices in an Internet of Things environment, The Journal of Supercomputing, Mar. 2017, vol. 73, Issue 3, pp. 1152-1167 (abstract), 5 Pages.

(Continued)

*Primary Examiner* — Dong U Kim
(74) *Attorney, Agent, or Firm* — McDonnell Boehnen Hulbert & Berghoff LLP

(57) ABSTRACT

An example method includes partitioning a software application into two or more instruction blocks each containing one or more software instructions. The two or more instruction blocks are arranged in a sequence defining an order in which to execute the two or more instruction blocks. The method may also involve storing, in a first block of the two or more instruction blocks, a first identifier of the first block and storing, in a second block of the two or more instruction blocks, (i) a second identifier of the second block, (ii) the first identifier of the first block, and (iii) a one-way cryptographic hash of contents of the first block. The first block is adjacent to the second block in the sequence. The method may additionally include transmitting, to a computing device, the two or more instruction blocks for execution by the computing device in the defined order.

20 Claims, 10 Drawing Sheets

(56) References Cited

U.S. PATENT DOCUMENTS

| | | | |
|---|---|---|---|
| 2010/0088705 A1* | 4/2010 | Attinella | G06F 12/1441 718/102 |
| 2012/0236010 A1* | 9/2012 | Ginzburg | G06F 12/08 345/502 |
| 2012/0278665 A1* | 11/2012 | Serebryany | G06F 11/073 714/53 |
| 2012/0311336 A1* | 12/2012 | Layton | G06F 21/64 713/176 |
| 2015/0020198 A1* | 1/2015 | Mirski | G06F 21/566 726/23 |
| 2016/0224784 A1* | 8/2016 | Krishnaswamy | G06F 21/52 |
| 2017/0228535 A1* | 8/2017 | Shanbhogue | G06F 21/52 |
| 2017/0345011 A1 | 11/2017 | Salami et al. | |
| 2017/0352027 A1 | 12/2017 | Zhang et al. | |
| 2017/0353309 A1 | 12/2017 | Gray | |
| 2018/0004690 A1* | 1/2018 | Kaminski | G06F 13/18 |
| 2018/0005186 A1 | 1/2018 | Hunn | |
| 2018/0096360 A1 | 4/2018 | Christidis et al. | |
| 2018/0137465 A1 | 5/2018 | Batra et al. | |
| 2018/0144156 A1 | 5/2018 | Marin | |

OTHER PUBLICATIONS

Dorri, Blockchain for IoT Security and Privacy: The Case Study of a Smart Home, IEEE Percom Workshop on Security Privacy and Trust in the Internet of Thing, Mar. 2017, 7 Pages.

Milenkovic, Architectures for Run-time Verification of Code Integrity, Dissertation Submitted to The University of Alabama in Huntsville and The University of Alabama at Birmingham, 2005, 158 Pages.

Myles, The Use of Software-Based Integrity Checks in Software Tamper Resistance Techniques, IBM Almaden Research Center, Retrieved on Jun. 3, 2018, 33 Pages.

Dickson, How blockchain can help fight cyberattacks, TechCrunch, Dec. 5, 2016, 16 Pages.

\* cited by examiner

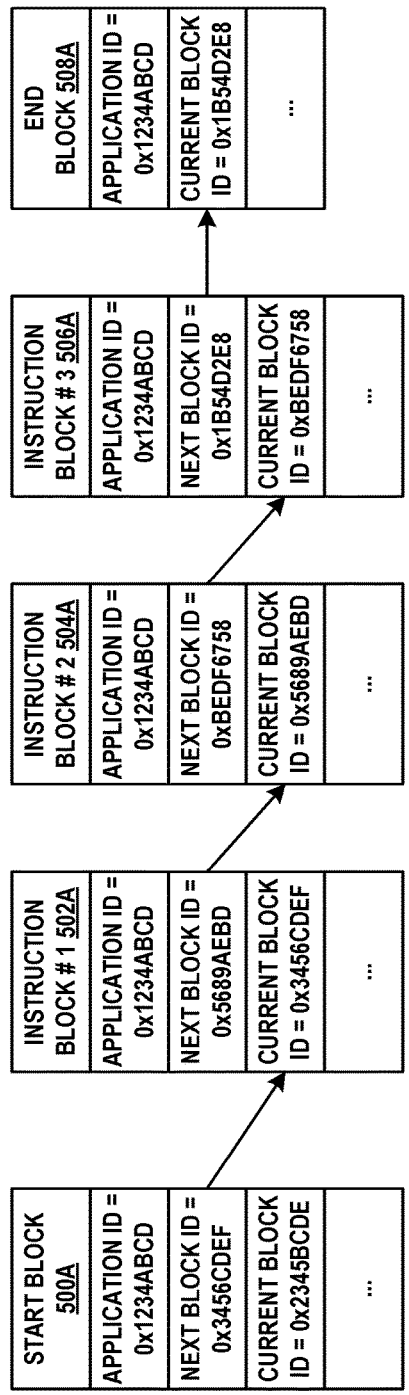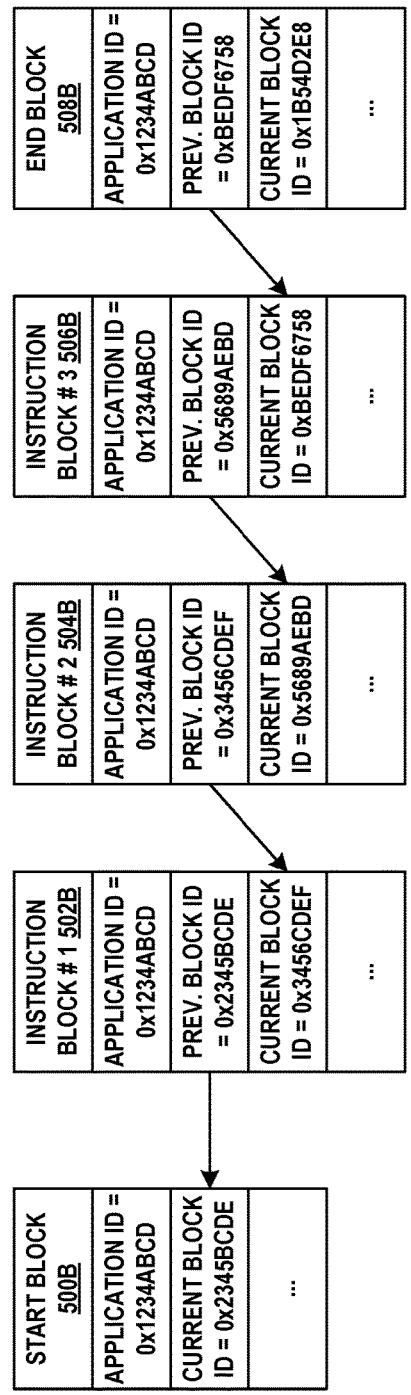
Figure 5A
Figure 5B

PROGRAM VERIFICATION USING HASH CHAINS

BACKGROUND

Malware includes any software intentionally designed to cause damage to a computer. Malware may take the form of a virus, a Trojan horse, a worm, or spyware, among other possibilities. Computer security involves controlling access to computing resources in order to prevent malware from unauthorized use and manipulation of the computing resources of a computing device, the software installed thereon, or the data stored thereon. However, malware often attempts to utilize security vulnerabilities such as errors or flaws in a computer's hardware, operating system, or software to cause the computer to execute malicious software code. Limiting malware's ability to utilize security vulnerabilities is an important step in improving the security of computing devices.

SUMMARY

An example embodiment may involve organizing trusted software into chained blocks as a way to improve computer security. A trusted software application may be partitioned into a plurality of instruction blocks each containing one or more instructions (e.g., compiled instructions, interpreted instructions). The blocks may be organized into a chain, with each block in the chain linked to its adjacent block via an identifier and validated via a one-way cryptographic signature stored in the neighboring block. The chain of blocks, rather than bare instructions, may be provided to a computing device for execution. Before executing any of the instructions stored in the blocks of the chain, the computing device may verify the chain to determine whether or not it has been tampered with between the time at which it was generated and runtime.

Verification may involve determining whether a block's computed cryptographic signature matches the cryptographic signature corresponding to that block and stored in the adjacent block. When the signatures match, the instructions stored in the block may be executed. When the signatures do not match, indicating that the block has been modified after it was generated, the instructions might not be executed to avoid execution of any potentially-malicious instructions stored in the block. Verification may proceed block-by-block, with each block being verified only after the instructions stored in a preceding block have been executed. Additionally, before receiving and executing software applications organized into chained blocks, the computing device may be provisioned with a predefined list or map of trusted applications that it is approved to execute. The map of trusted application may include, for each trusted application, an indication of a number of blocks into which the trusted application is organized and a cryptographic signature of the trusted application. Thus, when a malicious software application is organized into a chain of blocks for execution by the computing device, the malicious software application will not be executed by the computing device as it is not part of the map of trusted applications.

In a first example embodiment, a method is provided that includes partitioning, by a computing device, a software application into two or more instruction blocks each containing one or more software instructions. The two or more instruction blocks are arranged in a sequence defining an order in which to execute the two or more instruction blocks. The method also includes storing, by the computing device and in a first block of the two or more instruction blocks, a first identifier of the first block. The method additionally includes storing, by the computing device and in a second block of the two or more instruction blocks, (i) a second identifier of the second block, (ii) the first identifier of the first block, and (iii) a one-way cryptographic hash of contents of the first block. The first block is adjacent to the second block in the sequence. The method further includes transmitting, by the computing device and to a second computing device, the two or more instruction blocks for execution by the second computing device in the defined order.

In a second example embodiment, a non-transitory computer readable storage medium is provided having stored thereon instructions that, when executed by a computing device, cause the computing device to perform operations in accordance with the first example embodiment.

In a third example embodiment, a system is provided that includes a processor and a non-transitory computer-readable storage medium. The non-transitory computer-readable storage medium has stored thereon instructions that, when executed by the processor, cause the processor to perform the operations in accordance with the first example embodiment.

In a fourth example embodiment, a system is provided that includes means for partitioning a software application into two or more instruction blocks each containing one or more software instructions. The two or more instruction blocks are arranged in a sequence defining an order in which to execute the two or more instruction blocks. The system also includes means for storing, in a first block of the two or more instruction blocks, a first identifier of the first block. The system additionally includes means for storing, in a second block of the two or more instruction blocks, (i) a second identifier of the second block, (ii) the first identifier of the first block, and (iii) a one-way cryptographic hash of contents of the first block. The first block is adjacent to the second block in the sequence. The system further includes means for transmitting, to a computing device, the two or more instruction blocks for execution by the computing device in the defined order.

In a fifth example embodiment, a method is provided that includes receiving, by a computing device, two or more instruction blocks for execution by the computing device. The two or more instruction blocks each contain one or more software instructions of a software application. The two or more instruction blocks are arranged in a sequence defining an order in which to execute the two or more instruction blocks. A first block of the two or more blocks has stored therein a first identifier of the first block. A second block of the two or more blocks has stored therein (i) a second identifier of the second block, (ii) the first identifier of the first block, and (iii) a one-way cryptographic hash of contents of the first block. The first block is adjacent to the second block in the sequence. The method also includes computing a one-way cryptographic hash of the contents of the received first block. The method additionally includes, when the one-way cryptographic hash stored in the second block matches the computed one-way cryptographic hash of the contents of the received first block, executing, by the computing device, the one or more software instructions contained in the first block. The method further includes, when the one-way cryptographic hash stored in the second block does not match the computed one-way cryptographic hash of the contents of the received first block, terminating, by the computing device, execution of the software application.

In a sixth example embodiment, a non-transitory computer readable storage medium is provided having stored thereon instructions that, when executed by a computing device, cause the computing device to perform operations in accordance with the fifth example embodiment.

In a seventh example embodiment, a system is provided that includes a processor and a non-transitory computer-readable storage medium. The non-transitory computer-readable storage medium has stored thereon instructions that, when executed by the processor, cause the processor to perform the operations in accordance with the fifth example embodiment.

In an eighth example embodiment, a system is provided that includes means for receiving two or more instruction blocks for execution by the system. The two or more instruction blocks each contain one or more software instructions of a software application. The two or more instruction blocks are arranged in a sequence defining an order in which to execute the two or more instruction blocks. A first block of the two or more blocks has stored therein a first identifier of the first block. A second block of the two or more blocks has stored therein (i) a second identifier of the second block, (ii) the first identifier of the first block, and (iii) a one-way cryptographic hash of contents of the first block. The first block is adjacent to the second block in the sequence. The system also includes means for computing a one-way cryptographic hash of the contents of the received first block. The system additionally includes means for, when the one-way cryptographic hash stored in the second block matches the computed one-way cryptographic hash of the contents of the received first block, executing the one or more software instructions contained in the first block. The system further includes means for, when the one-way cryptographic hash stored in the second block does not match the computed one-way cryptographic hash of the contents of the received first block, terminating execution of the software application.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 5A and 5B illustrate different approaches for chaining blocks together, in accordance with example embodiments.

DETAILED DESCRIPTION

Figure 1:
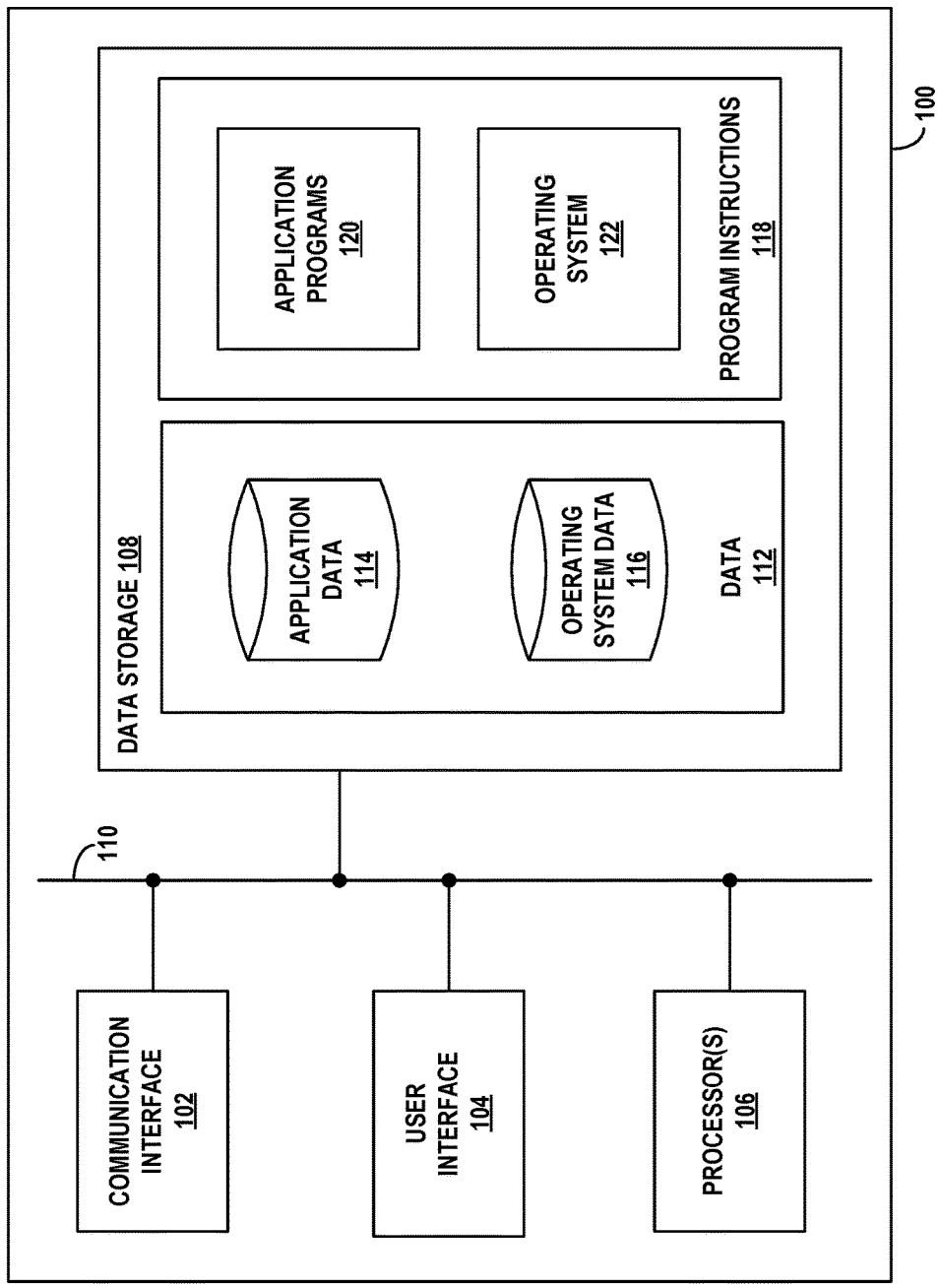
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

Computer security involves various methods of limiting the ability of malicious users and malicious software applications to access or control the computing resources and data of computing devices. Nevertheless, in spite of efforts to keep computing devices secure, some software applications may contain imperfections, errors, or flaws that may be exploited by malicious users or malicious software applications to force or trick computing devices to execute malicious instructions. Because a computing device is an open loop system at the instruction level, it is not configured to distinguish between trusted software instructions and malicious software instructions. That is, a processor treats a malicious "jump to address" instruction the same as a trusted "jump to address" instructions once such instructions are loaded into program memory. Although various antivirus tools are available to detect malware before the malware's instructions are loaded into program memory for execution, no antivirus tool can perfectly detect all possible malware. Additionally, many computing devices such as, for example, Internet of Things (IoT) devices, might not have the computational resources to execute an antivirus tool.

Additionally, the large number of computing devices in existence combined with the fact that many of these computing devices utilize general-purpose hardware (e.g., commercially-available x86 or ARM® processors) and general-purpose operating systems (e.g., LINUX®) means that a hack (i.e., a method of causing a computing device to execute unapproved, and often malicious, instructions) developed for one computing device will often also work for many other similar computing devices. Accordingly, when the hack produces some desirable result for the malicious user (e.g., obtainment of information that can be sold, mining of cryptocurrency, etc.), the malicious user has an incentive to continue hacking computing devices.

The techniques herein described provide a feedback system that allows a computing device to distinguish malicious instructions from trusted instructions and provide various barriers to using a single hack to maliciously control a larger number of computing devices. Thus, the techniques herein described improve computer security and remove some of the incentives in developing hacks for computing devices.

Trusted software may be transmitted from a trusted computing device (e.g., a server) to a remote computing device (e.g., an IoT device, a personal computer, a phone, robotic device, or another device connected to a computer network) for execution thereby. Conventionally, the software would be sent as a file that includes therein the instructions of the trusted software. However, the file could be intercepted during transmission, modified to include malicious instructions, and the modified file forwarded to the remote computing device, thus resulting in the remote computing device being configured to execute the malicious instructions. Alternatively, the trusted software might be successfully transmitted without interception, but an error or flaw therein could be exploited at runtime to inject malicious instructions and cause execution thereof.

In order to avoid these and other malicious exploits, the trusted software may instead be arranged into a plurality of blocks, containing trusted software instructions, that are chained together with identifiers and validated using cryptographic signatures to enforce execution of only the trusted software instructions. The remote computing device may be configured to only execute a predefined list of software applications arranged into chained blocks. Thus, the remote computing device might not execute (i) instructions that are not contained in a properly-chained block and (ii) instructions that are in a chain of blocks that has not been approved for execution by the remote computing device.

The instructions that make up a trusted software application may be partitioned into one or more instruction blocks, with each instruction block storing one or more software instructions. Additionally, each block may also store therein an identifier of a neighboring block (e.g., a preceding block or a subsequent block) and the block's own identifier. The identifier may be a random number, a cryptographic hash, or the actual instructions that are to be executed, among other possibilities. The identifiers may link neighboring blocks together and thus define the order of blocks in the chain to allow the remote computing device to correctly execute the software application (i.e., execute the instructions in the blocks in the right order).

Each block may also store therein a one-way cryptographic signature, or hash, of contents of the neighboring block. The contents of the neighboring block may include the instructions, as well as a corresponding cryptographic signature of another block adjacent to the neighboring block, among other contents. The cryptographic signature of a given block may thus depend on multiple other cryptographic signatures of neighboring blocks. The instruction blocks may be arranged between a start block and an end block in a sequence defining the order in which the instructions stored therein are to be executed. This chain of blocks, including the start block, the end block, and the instruction blocks therebetween, may be transmitted from the trusted computing device to the remote computing device for execution thereby.

The remote computing device may be configured to only execute instructions that are arranged in a valid chain of blocks. To that end, the remote computing device might not execute instructions that have not been provided in a block. Additionally, the remote computing device may validate each instruction block individually, by checking that a cryptographic signature of its contents, computed by the remote computing device before execution of the block, matches the cryptographic signature stored in the neighboring block.

For example, a first instruction block may include a first identifier corresponding to itself and a second identifier corresponding to a second block adjacent to the first block. Similarly, the second instruction block may include a third identifier corresponding to itself and a fourth identifier corresponding to a third block adjacent to the second block, and so on. Thus, the second identifier of the first instruction block may announce to the remote computing device the value of the third identifier of the second block that should be executed next. Similarly, the fourth identifier of the second block may announce to the computing device the value of an identifier of the third block that should be executed next, and so on.

The first block may contain a cryptographic hash of contents of the second block and the second block may contain a cryptographic hash of contents of the third block, and so on. These cryptographic hashes may be computed and stored in the corresponding blocks when the blocks are generated by a trusted computing device. Hash values may be recomputed before execution by the remote computing device and compared against the stored values to determine whether any modifications took place between generation and execution of a block.

After reception of the blocks by the remote computing device, the first, second, third, and fourth identifiers may be used to determine an order in which to execute the blocks. If any of the block have been tampered with such that the first, second, third, and fourth identifiers cannot be used to order all of the blocks, the remote computing device might not execute any of the blocks as a precaution to avoid executing any potentially-malicious instructions.

Additionally, before execution of a respective block, the remote computing device may compute a hash of the respective block using the same one-way cryptographic hash function that was used to compute the respective block's corresponding hash stored in the neighboring block. For example, when the hash computed by the remote computing device over contents of the second block matches the hash value stored in the first block (which validates the second block), instructions stored in the second block may be executed by the remote computing device. A match between the computed and stored hashes may indicate a valid chain that has not been tampered with.

When the hash computed by the remote computing device over contents of the second block does not match the hash value stored in the first block, computing device may cease execution of the instructions in the chain of blocks, or take other precautionary measures to avoid execution potentially malicious instructions. Reception of the first block thus enforces future computing behavior in that only a block containing an identifier that matches the second identifier and hashes to the correct value can be executed after the first block. Thus, the remote computing device may be configured to execute the instructions of an entire chain sequentially before executing the instructions stored in another chain.

Further, in addition to validating blocks individually, the remote computing device may validate the entire chain of blocks as a whole by checking that an identifier of the software application, a number of blocks in the chain containing the software application, and a cryptographic signature of the software application (hash of all the instructions in the blocks) match one of the software applications approved for execution on the remote computing device. To the end, the remote computing device may store thereon a map of approved software applications. Thus, a malicious computing device may be unable to cause the remote computing device to execute malicious instructions by arranging the malicious instructions in a chain of malicious blocks because the chain of malicious instructions is not part of the map of approved software applications.

Yet further, the structure of the blocks in a chain may be varied across different types or different groups of remote computing devices. The structure of a block may be varied by using different types of indicators, including therein additional indicators, including a timestamp, or varying the manner in which blocks validate each other (e.g., having a block validate a subsequent block, having the block be validated by a preceding block, having a block validate multiple subsequent or preceding blocks), among other possibilities. Thus, a hack developed for a first group of computing devices might not work for a second group of computing devices that utilize a different block structure. As a result, any single hack might affect only a limited number of computing devices.

II. EXAMPLE COMPUTING DEVICE

FIG. 1 illustrates a simplified block diagram showing some of the components of an example computing device 100. By way of example and without limitation, computing device 100 may be a cellular mobile telephone (e.g., a smartphone), a computer (such as a desktop, notebook, tablet, handheld computer, server computer, or a specialized, purpose-built computer), a personal digital assistant (PDA), a home or business automation component, a digital television, a smartwatch, a control system of a robotic device, a network-connected device, or some other type of device capable of operating in accordance with the example embodiments described herein. It should be understood that computing device 100 may represent combinations of hardware and software that are configured to carry out the disclosed operations.

As shown in FIG. 1, computing device 100 may include communication interface 102, user interface 104, processor(s) 106, and data storage 108, all of which may be communicatively linked together by a system bus, network, or other connection mechanism 110.

Communication interface 102 may allow computing device 100 to communicate, using analog or digital modulation, with other devices, access networks, and/or transport networks. Thus, communication interface 102 may facilitate circuit-switched and/or packet-switched communication, such as plain old telephone service (POTS) communication and/or Internet protocol (IP) or other packetized communication. For instance, communication interface 102 may include a chipset and antenna arranged for wireless communication with a radio access network or an access point. Also, communication interface 102 may take the form of or include a wireline interface, such as an Ethernet, Universal Serial Bus (USB), or High-Definition Multimedia Interface (HDMI) port. Communication interface 102 may also take the form of or include a wireless interface, such as a Wi-Fi, BLUETOOTH®, infrared (IR) light, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 102. Furthermore, communication interface 102 may comprise multiple physical communication interfaces (e.g., a Wi-Fi interface, a BLUETOOTH® interface, and a wide-area wireless interface).

User interface 104 may operate to allow computing device 100 to interact with a user, such as to receive input from the user and to provide output to the user. Thus, user interface 104 may include input components such as a keypad, keyboard, touch-sensitive panel, computer mouse, trackball, joystick, microphone, and so on. User interface 104 may also include one or more output components such as a display screen that, for example, may be combined with a touch-sensitive panel. The display screen may be based on cathode ray tube (CRT), liquid-crystal display (LCD), light-emitting diode (LED) technologies, organic light emitting diode (OLED) technologies, or other technologies now known or later developed. User interface 104 may also be configured to generate audible output(s), via a speaker, speaker jack, audio output port, audio output device, earphones, and/or other similar devices.

In some embodiments, user interface 104 may include one or more buttons, switches, knobs, and/or dials that facilitate interaction with computing device 100. It may be possible that some or all of these buttons, switches, knobs, and/or dials are implemented by way of graphics on a touch-sensitive panel.

Processor(s) 106 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs).

Data storage 108 may include one or more volatile and/or non-volatile storage components, such as magnetic, optical, flash, or organic storage, and may be integrated in whole or in part with processor 106. Data storage 108 may include removable and/or non-removable components.

Processor(s) 106 may be capable of executing program instructions 118 (e.g., compiled or non-compiled program logic and/or machine code) stored in data storage 108 to carry out the various operations described herein. Therefore, data storage 108 may include a non-transitory computer-readable medium, having stored thereon program instructions that, upon execution by computing device 100, cause the computing device 100 to carry out any of the methods, processes, or operations disclosed in this specification and/or the accompanying drawings. The execution of program instructions 118 by processor(s) 106 may result in processor(s) 106 using data 112.

By way of example, program instructions 118 may include an operating system 122 (e.g., an operating system kernel, device driver(s), and/or other modules) and one or more application programs 120 (e.g., camera functions, image processing functions, address book, email, web browsing, social networking, and/or gaming applications) installed on computing device 100. Similarly, data 112 may include operating system data 116 and application data 114. Operating system data 116 may be accessible primarily to operating system 122, and application data 114 may be accessible primarily to one or more of application programs 120. Application data 114 may be arranged in a file system that is visible to or hidden from a user of computing device 100.

Application programs 120 may communicate with operating system 122 through one or more application programming interfaces (APIs). These APIs may facilitate, for instance, application programs 120 reading and/or writing application data 114, transmitting or receiving information via communication interface 102, receiving and/or displaying information on user interface 104, and so on.

In some examples, application programs 120 may be referred to as "apps" for short. Additionally, application programs 120 may be downloadable to computing device 100 through one or more online application stores or application markets. However, application programs can also be installed on computing device 100 in other ways, such as via a web browser or through a physical interface (e.g., a USB port) on computing device 100.

The components of the computing device may be distributed, logically or physically, over multiple devices of the same or of a different type. Additionally, multiple computing devices may work in combination to perform the operations described herein.

III. EXAMPLE SOFTWARE DISTRIBUTION ARCHITECTURE

Figure 2:
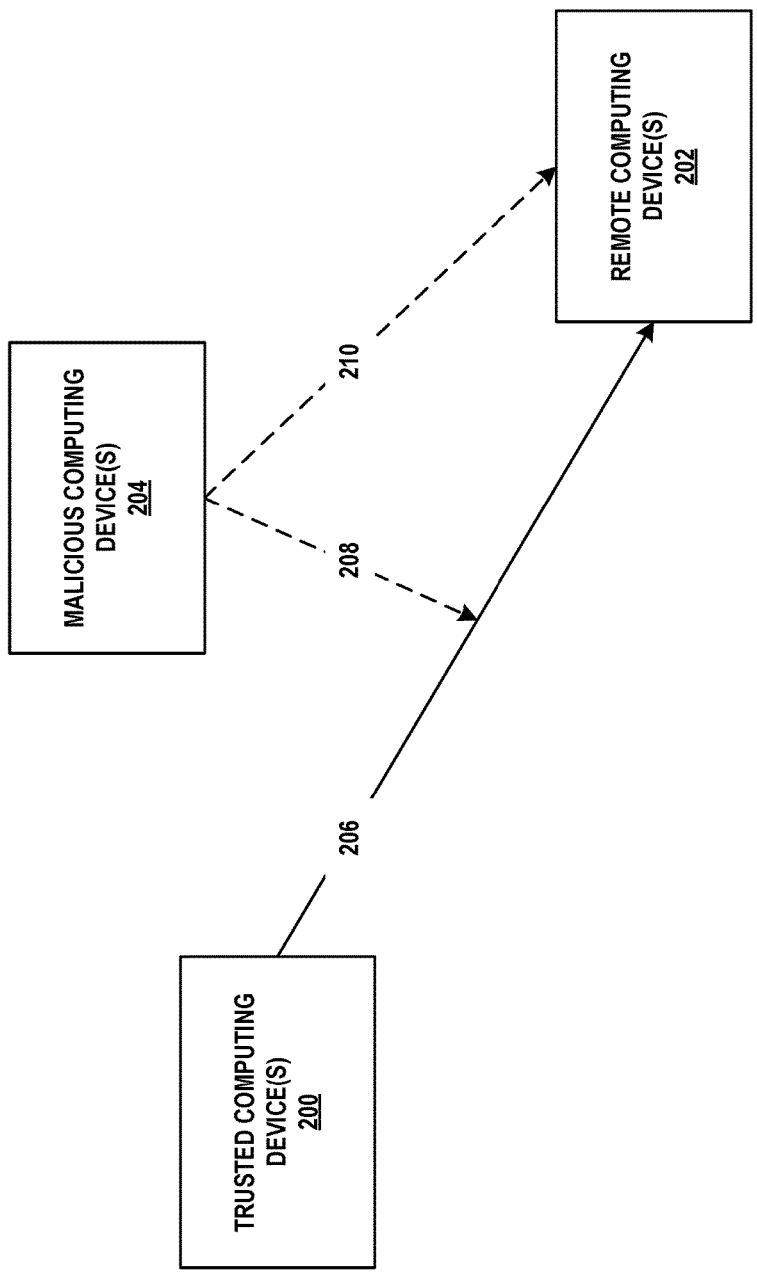
FIG. 2 illustrates an architecture for distributing trusted software, in accordance with example embodiments.

FIG. 2 illustrates an example architecture that may be used to distribute computer software among computing devices. Trusted computing device(s) 200 may have stored thereon software intended for distribution amongst remote computing device(s) 202. Trusted computing device(s) 200 may include one or more server devices communicatively connected to remote computing device(s) 202. Remote computing device(s) 202 may include, for example, personal computing devices (e.g., smartphones, laptops, smart watches), Internet of Things (IoT) devices, robotic devices, or Machine-to-Machine (M2M) devices, among other possibilities. IoT devices may include any physical devices, such as vehicles, cameras, or home appliances, that are equipped or embedded with computing resources, software, and/or sensors, among other components, and that are connected to a computer network (e.g., the Internet). M2M devices may include any computing devices configured to exchange information over a computer network and perform actions without manual assistance of a human. In some cases, remote computing device(s) 202 may include purpose-built computing devices (e.g., a camera device controlled by an ASIC).

The software distributed by trusted computing device(s) 200 may be trusted and configured to cause remote computing device(s) 202 to perform non-malicious operations. Non-malicious operations may include, for example, operations that users or administrators of remote computing device(s) 202 have approved, have been informed of, can inform themselves of, or can control the execution of. The trusted software may be distributed by trusted computing device(s) 200 to remote computing device(s) 202 by way of communicative connection 206. Distribution of the trusted software may be initiated in response to requests from remote computing device(s) 202, in response to instructions provided to trusted computing device(s) 200 from a user or administrator thereof, or in response to updates to the trusted software, among other possibilities.

However, in some cases, malicious computing device(s) 204 may also seek to communicate with remote computing device(s) 202 in an attempt to cause remote computing device(s) 202 to execute malicious operations (i.e., malicious software code or instructions). Malicious computing device(s) 204 may try to cause remote computing device(s) 202 to execute malicious operations by, for example, communicating with remote computing device(s) 202 directly, as indicated by communicative connection 210, or by acting as a man-in-the-middle (MIM) between trusted computing device(s) 200 and remote computing device(s) 202, as indicated by arrow 208, among other possibilities.

A MIM attack may involve intercepting the trusted software sent from trusted computing device(s) 200 along communicative connection 206, modifying the trusted software to include malicious operations, and providing the modified software to remote computing device(s) 202 for execution. Malicious computing device(s) 204 may also attempt to inject code via direct communication with remote computing device(s) 202 by exploiting any security vulnerabilities of remote computing device(s) 202 or the software stored thereon. Security vulnerabilities may include any code that allows for a stack overflow attack, heap overflow attack, format string attack, or a dangling pointer attack, among other possible types of attacks.

In many cases, such attacks are made possible by the fact that remote computing device(s) 202 include computing hardware and an operating system that may be used to execute any successfully-injected instructions. The computing hardware and operating system do not include any feedback mechanisms that would allow it to distinguish malicious code from non-malicious code. Accordingly, once malicious code is successfully injected into an area of program memory, the malicious code may be executed by the hardware. When remote computing device(s) 202 do not include anti-virus software (e.g., many IoT and M2M devices), or when anti-virus software protection is inadequate, remote computing device(s) 202 may be controlled by the malicious code to perform various operations which the user, operator, or administrator of remote computing device(s) 202 did not and would not allow.

IV. EXAMPLE ARRANGEMENT OF CHAINED BLOCKS

Figure 3A:
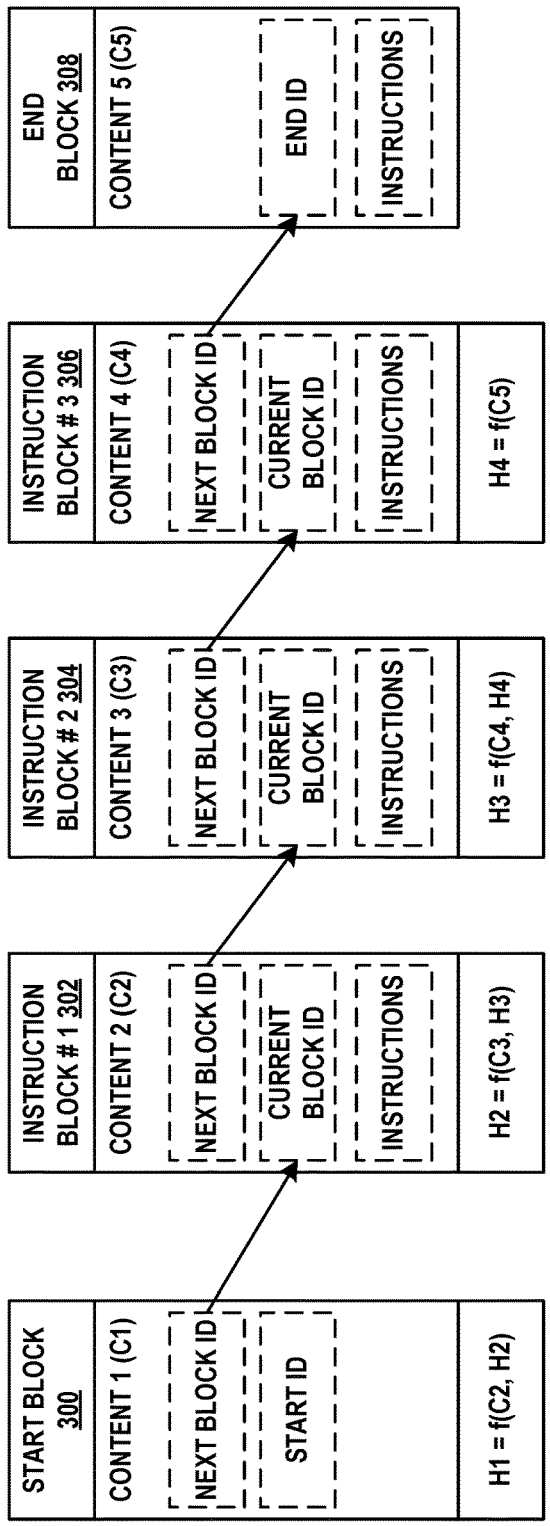
FIG. 3A illustrates an arrangement of chained blocks, in accordance with example embodiments.

FIG. 3A illustrates an example architecture for securely controlling the operations executed by remote computing device(s) 202. A plurality of blocks 300, 302, 304, 306, and 308 (i.e., blocks 300-308) may be used to format trusted software for transmission from trusted computing device(s) 200 to remote computing device(s) 202 and execution by remote computing device(s) 202. The instructions that make up the trusted software application may be allocated among blocks 300-308. Blocks 300-308 may be chained together using identifiers. Additionally, the chain of blocks 300-308 may be locked or sealed to prevent any changes to blocks 300-308 by way of one-way cryptographic hash functions such as message digest 5 (MD5) or Secure Hash Algorithm (SHA), among other possibilities.

The chaining of blocks 300-308 together results in any instructions stored therein having to be executed in an order defined by the sequence of blocks in the chain. The instructions of a given block are announced and validated by an identifier stored in a neighboring block. Additionally, each block is cryptographically sealed to allow for detection of any changed made thereto after generation of the block, thus providing feedback as to whether a given instruction is trusted or malicious.

A one-way hash function, also known as a message digest or a fingerprint function, is a mathematical function which takes a variable-length input and converts it into a fixed-length sequence. Additionally, a one-way hash function is designed in a way that makes it difficult to reverse the hashing process, meaning that once an input is hashed, it is very difficult (i.e., nearly impossible in practice) to determine the input that produced the hash. Further, a good one-way hash function also makes it difficult to find two different inputs that would produce the same hash value.

Block 300 is a start block that indicates the start of a sequence of blocks that contain trusted instructions to be executed by a computing device. Start block 300 may be associated with a start identifier, stored in content 1, that is known to the remote computing device to which blocks 300-308 are sent for execution. When the start identifier of start block 300 matches the start identifier stored on the remote computing device, the remote computing device may recognize start block 300 as initiating a valid chain of blocks.

Start block 300 may additionally contain a next block identifier that links block 300 to first instruction block 302. First instruction block 302 may include in content 2 thereof a current block identifier that uniquely identifies first instruction block 302 in the sequence of blocks 300-308. Blocks 300 and 302 may be generated such that the value of the current block identifier of first instruction block 302 is equal to the value of the next block identifier stored in start block 300. By including the next block identifier in start block 300, start block 300 may announce, to the remote computing device receiving the sequence of blocks 300-308, the next block that the remote computing device should execute (i.e., first instruction block 302). First instruction block 302 may also contain one or more instructions (e.g., compiled code, interpreted code) that make up part of the trusted application and that are to be executed by the remote computing device. First instruction block 302 may also contain a next block identifier corresponding to second instruction block 304.

Start block 300 may additionally include therein hash H1. Hash H1 represents the one-way hash of content 2 and identifier H2 stored in block 302. Hash H1 may be used to seal first instruction block 302 after it is generated so that any changes made thereto after its generation are detectable by recomputing its hash value. Accordingly, before executing instructions contained in block 302, the remote computing device may verify that first instruction block 302 has not been tampered with, and thus contains trusted instructions, by computing the hash value of block 302 using the same one-way hash function that was used to compute hash H1.

When content 2 and hash H2 are not changed, the hash value computed by the remote computing device will be equal to hash H1 stored in start block 300, indicating that first instruction block 302 has not been modified since its generation and may be safely executed. When content 2 and/or hash H2 is changed, the hash value calculated by the computing device will differ from hash value H1 stored in start block 300, indicating that first instruction block 302 has been modified since its generation and should not be executed because it may contain malicious instructions.

The remaining blocks may be chained together in a similar manner. Namely, first instruction block 302 may contain a next block identifier that links first instruction block 302 to the current block identifier of second instruction block 304, second instruction block 304 may contain a next block identifier that links second instruction block 304 to the current block identifier of third instruction block 306, and third instruction block 306 may contain a next block identifier that links third instruction block 306 to the end identifier of end block 308.

The next block identifier in first instruction block 302 may indicate that the remote computing device should execute second instruction block 304 (i.e., a block having a current block identifier equal to the next block identifier of first instruction block 302) after first instruction block 302. Similarly, the next block identifier in second instruction block 304 may indicate that the remote computing device should execute third instruction block 306 after second instruction block 304, and the next block identifier in third instruction block 306 may indicate that the remote computing device should execute end block 308 after third instruction block 306. By using block identifiers, blocks 300-308 may be organized into the sequence needed to arrange the instructions stored therein in an order that correctly reconstitutes the software application transmitted in blocks 300-308.

Each of blocks 304-308 may also be cryptographically sealed using a corresponding hash value included in blocks 302-306, respectively. Namely, hash H2 stored in first instruction block 302 may represent a one-way hash of content 3 and hash H3 stored in second instruction block 304, hash H3 stored in second instruction block 304 may represent a one-way hash of content 4 and identifier H4 stored in third instruction block 306, and hash H4 stored in third instruction block 306 may represent a one-way hash of content 5 stored in end block 308. A change in a block's contents will result in the block's computed hash value (i.e., computed after the change has been made) differing from the hash value stored by the preceding block (i.e., computed and stored before the change has been made).

Accordingly, before executing instructions contained in second instruction block 304, the remote computing device may verify that second instruction block 304 has not been tampered with, and thus contains trusted instructions, by computing the hash value of second instruction block 304 using the same one-way hash function that was used to compute hash H2 stored in first instruction block 302. Similarly, before executing instructions contained in third instruction block 306, the remote computing device may verify that third instruction block 306 has not been tampered with, and thus contains trusted instructions, by computing the hash of third instruction block 306 using the same one-way hash function that was used to compute hash H3 stored in second instruction block 304. Further, before terminating execution of the software application, as indicated by end block 308, the remote computing device may verify that end block 308 has not been tampered with by computing the hash value of end block 308 using the same one-way hash function that was used to compute hash H4 stored in third instruction block 306.

When the computed hash value of a given block matches the corresponding hash value stored in the preceding block, indicating that the given block has not been modified since its generation (e.g., during or after transmission from trusted computing device(s) 200 to the remote computing device), the instructions stored in the given block may be executed by the remote computing device. On the other hand, when the computed hash value of the given block differs from the corresponding hash value stored in the preceding block, indicating that the given block has been modified after its generation, the instructions stored in the given block might not be executed because the given block may contain malicious instructions.

Notably, each of hash values H1, H2, and H3 in the sequence of blocks 300-308 is dependent upon the value of at least one other of these hash values. For example, hash H3 is a function of hash H4. Hash H2 is a function of hash H3, which is a function of hash H4. Similarly, hash H1 is a function of hash H2, which is a function of hash H3, which in turn is a function of hash H4. Accordingly, a modification to any one of blocks 302-308 will alter the hash of at least one other block of blocks 300-308, thus allowing unauthorized modifications to individual blocks to be detected. Additionally, because each of hashes H1, H2, H3, and H4 is the output of a one-way hash function, it is very difficult to generate a block for unauthorized insertion into the chain that, when hashed, will result in a hash value equal to one of the values of hashes H1, H2, H3, or H4. Accordingly, insertion of a block into a valid chain without detection is very difficult (and nearly impossible in practice if a good hash function is used).

End block 300 may be associated with an end identifier, stored in content 5, that is known to the remote computing device to which blocks 300-308 are sent for execution. When the end identifier of end block 308 matches the end identifier stored on the remote computing device, the remote computing device may recognize end block 308 as terminating a valid chain of blocks. Notably, the entire chain of blocks 300-308 may be transmitted to and received by the remote computing device before execution of the instructions therein is initiated. Thus, the identifiers of both the start and end blocks 300 and 308 may be used by the remote computing device to determine whether the chain is valid and where execution of instructions should start and terminate.

Each of blocks 300-308 may be individually validated by the remote computing device at runtime. That is, after reception of blocks 300-308 from trusted computing device(s) 200, in addition to validating all of blocks 300-308 at once (i.e., the entire software application) before installation or execution, each of blocks 300-308 may be validated sequentially at runtime. Namely, second instruction block 304 may be validated after the instructions in first instruction block 302 have been successfully executed. Similarly, third instruction block 306 may be validated after the instructions in second instruction block 304 have been successfully executed. Validating each block shortly before its execution allows for detection of any malicious modifications made to the block after its reception by the remote computing device and before its execution. On the contrary, validating all of blocks 300-308 at once after reception, without subsequent validation of individual blocks, would allow a larger time window during which a given block could be maliciously modified (i.e., after the chain's validation but before the block's execution).

Chaining, validating, and executing the blocks in this manner provides a feedback system that allows the remote computing device to distinguish between trusted and malicious blocks and instructions within a received trusted chain. Namely, because a given block announces and enforces the contents of a neighboring block, the remote computing device is able to recognize an instruction as potentially malicious when the instruction has not been announced or validated by another block. Thus, the computing device might not execute instructions contained in a block whose (i) current block identifier does not match the next block identifier announced by the neighboring block or (ii) calculated hash value does not match the hash value announced by the neighboring block. Malicious computing device(s) 204 may thus be unable to (i) insert a block containing malicious instructions into a trusted chain or (ii) modify a block within the trusted chain to include malicious instruction, without detection by the remote computing device.

Additionally, the computing device may be configured to only execute instructions that have been provided in the chained arrangement of blocks. The computing device might not execute instructions that are not provided in the chained arrangement of blocks. Malicious computing device(s) 204 may thus be unable to cause remote computing device(s) 202 to execute non-chained malicious instructions.

In some implementations, the identifiers used to chain blocks together may be a random number, one or more of the instructions to be executed by the remote computing device, or the cryptographic hash, among other possibilities. For example, the current block identifier in first instruction block 302, as well as the next block identifier in start block 300, may be a random number assigned to first instruction block 302 by trusted computing device(s) 200. In another example, the current block identifier of first instruction block 302 may be the instructions stored in first instruction block 302 (i.e., the current block identifier field and the instructions field may be merged into one and used to identify the block and store instructions for execution). The next block identifier of start block 300 may link start block 300 to first instruction block 302 by including in the next block identifier of start block 300 one or more of the instructions stored in first instruction block 302.

In some implementations, a copy of hash H1 may also be included within first instruction block 302 and may thus be used to link first instruction block 302 to start block 300. Similarly, a copy of hash H2 may also be included within second instruction block 304, a copy of hash H3 may also be included within third instruction block 306, and a copy of hash H4 may also be included within end block 308. The hash values may thus be used to both link together and validate adjacent blocks. Using hash values (rather than separate block identifier values) to link blocks may allow for a smaller block size, thus requiring less bandwidth to transmit a software application and less memory to store a chain of blocks.

In some implementations, the hash values may be computed in a way different from that shown in FIG. 3A. For example Hash H1 may be based on content 1 and hash H2, rather than content 2 and hash H2. Other variations may be possible.

V. EXAMPLE TRUSTED APPLICATION MAP

The chained arrangement of blocks illustrated in FIG. 3A enforces an ordering of blocks, and thus of instructions, of a software application. If any block in the chain 300-308 is changed, the change is identifiable based on hashes H1, H2, H3, or H4, the contents of start block 300, or the contents of end block 308. However, malicious computing device(s) 204 may be able to cause execution of malicious instructions on computing device(s) 202 by arranging the malicious instructions into a valid, but untrusted, chain of blocks. That is, a malicious software application may be partitioned into instruction blocks arranged between a start block and an end block, with each block correctly chained to a neighboring block using a corresponding identifier and validated using a one-way hash function. To prevent malicious computing device(s) 204 from generating and using a valid chain of blocks to cause execution of malicious instructions, each one of remote computing device(s) 202 may be provisioned with a map of trusted applications that it is allowed to execute. Any software applications not found within the map may be considered untrusted and might thus not be executed, even if these applications are presented in a valid chain of blocks.

Figure 3B:
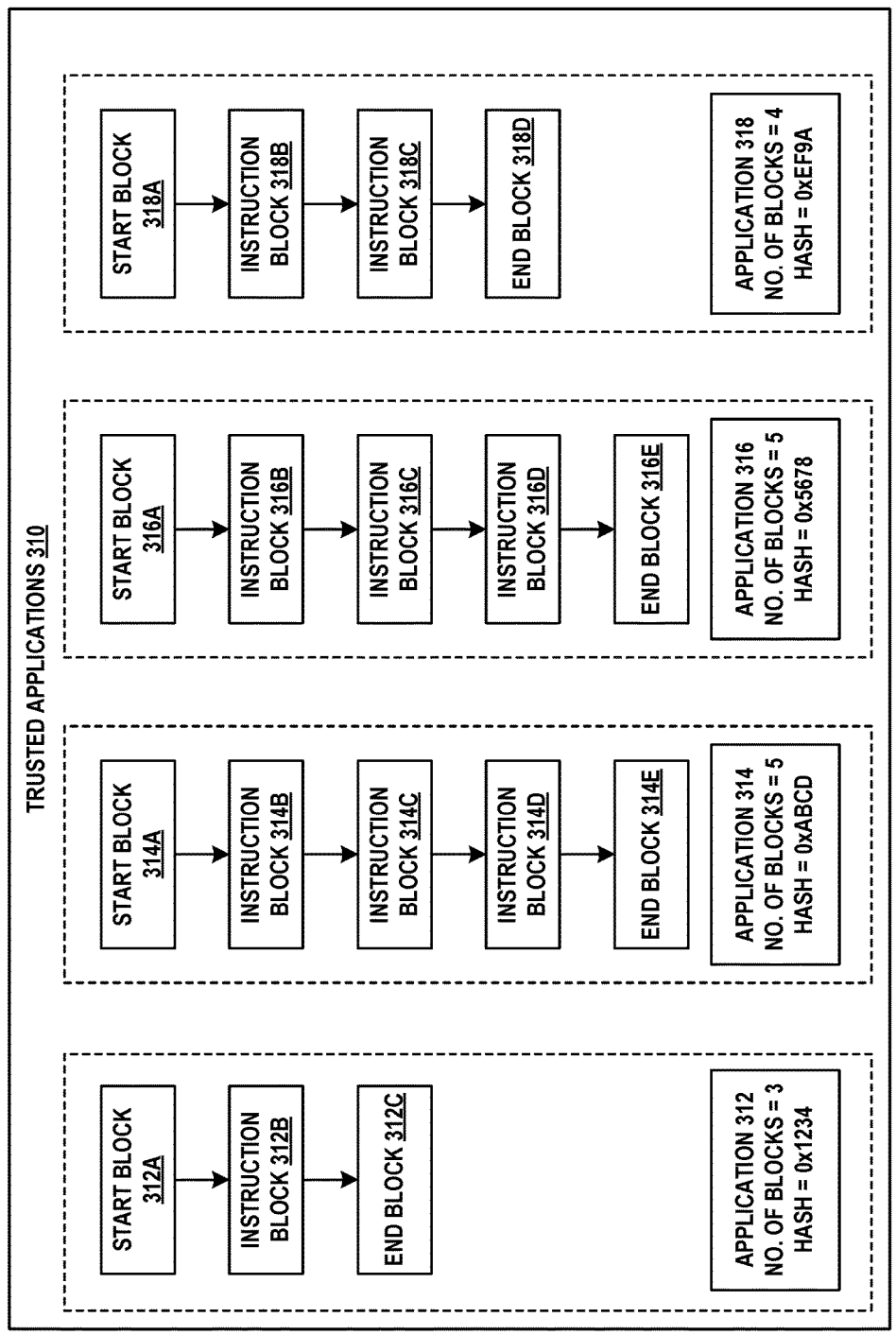
FIG. 3B illustrates a map of trusted software applications, in accordance with example embodiments.

FIG. 3B illustrates an example map of trusted applications 310 approved for execution on a given remote computing device. The map of trusted applications 310 may be known to both trusted computing device(s) 200 and the remote computing device to which the map corresponds. The remote computing device may be limited to executing only trusted applications 310 in the format indicated by the map. Thus, malicious computing device(s) 204 may be unable to cause the remote computing device to execute malicious instructions by providing the malicious instructions in a chain of blocks designed to resemble a trusted chain of blocks. Thus, even if malicious computing device(s) 204 sends a start block, an end block, and instruction blocks containing malicious instructions, these blocks will not be executed by the remote computing device because the blocks are not part of the map of trusted applications 310 for that remote computing device.

The map of trusted applications 310 includes therein data describing the properties of each of trusted applications 310. The map shown in FIG. 3B includes applications 312, 314, 316, and 318 as trusted applications approved for execution on the given remote computing device. The map indicates that application 312 is divided into a total of 3 blocks, including start block 312A, instruction block 312B, and end block 312C. A cryptographic signature or hash of application 312 is 0x1234. When identifier H1 is computed in the manner illustrated in FIG. 3A, the hash of application 312 may correspond to identifier H1 stored in start block 312A of application 312 since H1 depends on the hash values of all other blocks of software application 312. Alternatively, however, the hash of application 312 may be computed in other ways by, for example, computing the cryptographic hash of only the instructions that make up software application 312.

Additionally, the map indicates that application 314 is divided into a total of 5 blocks, including start block 314A, instruction blocks 314B. 314C and 314D, and end block 314E. A cryptographic signature or hash of application 314 is 0xABCD. The map further indicates that application 316 is divided into a total of 5 blocks, including start block 316A, instruction blocks 316B, 316C and 316D, and end block 316E. A cryptographic signature or hash of application 316 is 0x5678. Yet further, the map indicates that application 318 is divided into a total of 4 blocks, including start block 318A, instruction blocks 318B and 318C, and end block 318D. A cryptographic signature or hash of application 318 is 0xEF9A.

In some embodiments, the map may also indicate the start identifier associated with each of start blocks 312A, 314A, 316A, and 318A, as well as the end identifiers associated with each of end blocks 312C, 314E, 316E, and 318D. The start identifier and end identifier may be shared among all trusted applications 310 or, alternatively, may be unique to each one of applications 312, 314, 316, and 318 to make spoofing of the start block by malicious computing device(s) 204 more difficult.

When the remote computing device of remote computing device(s) 202 receives a software application for execution, the remote computing device may verify that the received software application is arranged in a chain of blocks, that the application identifier of the received software application corresponds to one of trusted applications 310, that the received software application is partitioned into a number of blocks corresponding to the number of blocks indicated by the map of trusted application 310, and that the cryptographic hash of the received software application matches the cryptographic hash indicated by the map of trusted applications 310 for that particular software application. If any of these verification steps fail, the remote computing device may determine that the received software application has not been approved for execution thereby, that the software application is likely to contain malicious instructions, and therefore the software application should not be executed.

Adding trusted applications to the map of trusted applications 310 may involve one of trusted computing device(s) 200 authenticating itself to the remote computing device and communicating therewith via an encrypted connection. Accordingly, malicious computing device(s) 204 would have to overcome the authentication barrier and the encryption barrier to insert a malicious application into the map of trusted applications 310. While such an even is unlikely, any applications added to the map of trusted applications 310 would be quickly identifiable by comparing the map stored on the remote computing device to the map stored on trusted computing device(s) 200. In other words, the architecture herein described would force any malware to reveal itself, rather than secretly operate in the background, before it can be executed. Any malicious applications could thus be quickly identified and removed.

Additionally, different types or groups of remote computing device(s) 202 may use different structures of the chained blocks. For example, smart appliances may utilize a forward-chained arrangement as illustrated in FIGS. 3A and 5A while camera devices may utilize a backward-chained arrangement illustrated in FIG. 5B. Similarly, a first group of remote computing device(s) 202 may be configured to use random numbers as block identifiers, a second group of remote computing device(s) 202 may be configured to use the instructions stored in the blocks as block identifiers, while a third group of remote computing device(s) 202 may be configured to use a cryptographic hash of the contents of a block as the block identifier.

Thus, any attempt by malicious computing device(s) 204 to inject malicious code will have to be tailored to a specific group or type of remote computing device(s) 202. A one-size-fits-all approach to injecting malicious code into different types of computing devices is no longer possible when the chained block architecture herein described is implemented. Accordingly, the amount of effort required to hack a given computing device is increased and the number of computing devices on which the identified hack would work is decreased, making the hacking process cost more resources and result in fewer hacked devices.

In some implementations, the map of trusted applications 310 may be provisioned among a number of remote computing device(s) 202 before the remote computing devices are deployed and/or connected to a network. For example, the map may be provisioned during a hardware manufacturing process of the remote computing device(s) 202. Alternatively, the map may be provisioned after hardware manufacturing and before the remote computing device(s) 202 are deployed into operation (e.g., in the case of an IP camera, before the camera is connected to a network and installed at a fixed location). For example, the map may be provisioned along with and at the same time as the provisioning of public and private keys for asymmetric cryptography and/or secure socket layer (SSL) or transport security layer (TSL) certificates.

Deployment of a computing device may involve configuring the computing device to operate for one or more intended purposes. Deployment may involve placing the computing device at a particular physical location, connecting the computing device to a network or other computing devices, installing firmware on the computing device, or modifying one or more settings of the computing device, among other activities.

Additionally, in some implementations, the provisioning may involve storing the map of trusted applications in read-only memory of the remote computing devices. For example, the map of trusted applications may be stored in read-only memory when the map is expected to remain unchanged over the lifetime of the remote computing devices. The map of trusted applications stored in read-only memory may thus be unmodifiable by malicious computing device(s) 204.

In some implementations, however, the map of trusted applications 310 may be modifiable. The map of trusted applications 310 may thus be updated via, for example, an encrypted network connection after deployment of the remote computing device. Trusted computing device(s) 200 may monitor the maps of remote computing device(s) 202 after deployment to identify any unexpected changes in the maps as a way to spot malware.

VI. EXAMPLE BLOCK STRUCTURE

Figure 4:
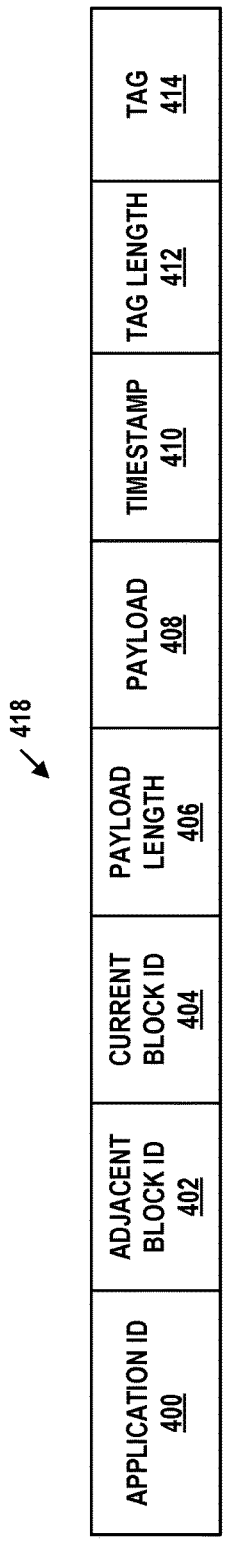
FIG. 4 illustrates a block structure, in accordance with example embodiments.

FIG. 4 illustrates an example structure of a block used to transmit software instructions. Block 418 may include application identifier 400, adjacent block identifier 402, current block identifier 404, payload length 406, payload 408, timestamp 410, tag length 412, and tag 414. Block 418 may be used as a start block, an end block, or an instructions block.

Application identifier 400 may be a unique identifier of a software application or a portion thereof that is being transmitted for execution to one of remote computing device(s) 202. The start block, the end block, and any instruction blocks of a given chain of blocks may each contain the same application identifier value. The remote computing device may be configured to only execute instructions stored in blocks having an application identifier that matches an application identifier stored in the map of trusted applications for that remote computing device.

Adjacent block identifier 402 may store the identifier associated with either a preceding block or a subsequent block in a chain of blocks. In some implementations, a block may include two adjacent block identifiers, one for a preceding block and one for a subsequent block, thus providing additional security to the chain. Current block identifier 404 may store the identifier associated with block 418 (e.g., block 302 may store its own identifier in this field). Current block identifier 404 of block 418 may be compared with adjacent block identifier 402 of an adjacent block to verify that block 418 is part of a valid chain of blocks and that block 418 has not been tampered with. Application identifier 400, adjacent block identifier 402, and current block identifier 404 may each have a fixed length or size.

Payload length 406 may indicate the size of payload 408, which may include the one or more instructions to be executed by the computing device to which the chain of blocks is transmitted. The size of block 418 may thus be varied to accommodate storage therein of different numbers and types of instructions. Timestamp 410 may indicate a time at which block 418 has been transmitted and/or a time at which block 418 is to be executed. The remote computing device may thus be configured to verify that timestamp 410 of block 418 is greater than a timestamp of a preceding block and smaller than a timestamp of a subsequent block, as well as that timestamp 410 is within a threshold time relative to a current time. Timestamp 410 may thus help prevent replay of the instructions in block 418. Timestamp 410 may have a fixed length or size.

Tag length 412 may indicate the size of tag 414, which may be a one-way cryptographic hash (i.e., a cryptographic signature) of the contents of block 418 or the contents of a block adjacent thereto. The contents of a block may include application identifier 400, adjacent block identifier 402, current block identifier 404, payload length 406, payload 408, timestamp 410, and tag length 412, and tag 414. Tag 414 may allow the computing device to determine whether block 418 has been tampered with by comparing tag 414 to a tag value computed by the remote computing device after reception of block 418 based on the contents of block 418 or an adjacent block. Tag fields 414 of blocks 300-306 may store, for example, the values of hashes H1, H2, H3, and H4, respectively, discussed with respect to FIG. 3A.

In some implementations, tag 414 and current block identifier 404 may be combined. That is, when current block identifier 404 of block 418 is a one-way hash based on the contents of block 418, another tag based on the contents of block 418 may be redundant and may thus be omitted.

VII. EXAMPLE CHAINING ARRANGEMENTS

FIGS. 5A and 5B illustrate examples of different ways in which consecutive blocks may be chained or linked together to form a chain of blocks. Specifically, FIG. 5A illustrates a forward chaining arrangement in which a preceding block announces and validates a subsequent block and FIG. 5B illustrates a backward chaining arrangement in which a subsequent block announces and validates a preceding block. In either case, a block is announced and validated before execution of the instructions therein using an identifier stored in a neighboring block. Unless indicated otherwise, whenever one chaining arrangement is herein referred to directly or indirectly, the other chaining arrangement may also be used.

FIG. 5A illustrates a chain of blocks that includes start block 500A, first instruction block 502A, second instruction block 504A, third instruction block 506A, and end block 508A. Each of blocks 500A-508A includes application identifier 0x1234ABCD corresponding to the application whose instructions are stored in instruction blocks 502A, 504A, and 506A. Each of blocks 500A-508A may also include the fields shown in FIG. 4, including a payload length, a payload (i.e., the instructions to be executed), a timestamp, a tag length, and a tag, as indicated by the ellipses. The prefix "0x" is herein used to indicate a hexadecimal number. Additionally, any numbers or identifiers provided herein are for the purpose of example only. The number of bits used to represent the different numbers and identifiers may vary between implementations.

Current block identifier 0x2345BCDE of start block 500A may indicate a start of a sequence of blocks. Next block identifier 0x3456CDEF of start block 500A may identify and correspond to first instruction block 502A expected to be executed after start block 500A and may have the same value as the current block identifier stored in first instruction block 502A.

If, after transmission to and reception by the remote computing device, the computed hash of first instruction block 502A matches the corresponding hash value stored in previously-received start block 500A (indicating that block 502A has not been modified or tampered with), the instructions stored in first instruction block 502A may be executed by the remote computing device. Otherwise, the remote computing device may stop executing the instructions in the chain of blocks 500A-508A, stop executing all instructions (e.g., instructions in other chains of blocks), or take other precautionary measures to avoid executing any malicious instructions that may have been injected into the remote computing device.

Similarly, next block identifier 0x5689AEBD of first instruction block 502A may identify and correspond to second instruction block 504A expected to be executed after first instruction block 502A and may have the same value as the current block identifier stored in second instruction block 504A. When the computed hash of second instruction block 504A matches the corresponding hash value stored in previously-received first instruction block 502A match, the instructions in second instruction block 504A may be executed by the remote computing device. The same verification process may be performed with respect to third instruction block 506A and end block 508A. Notably, end block 508A might not contain any instructions but its verification may allow the remote computing device to determine that a valid chain has been successfully received.

FIG. 5B illustrates a chain of blocks that includes start block 500B, first instruction block 502B, second instruction block 504B, third instruction block 506B, and end block 508B. Each of blocks 500B-508B includes application identifier 0x1234ABCD corresponding to the application whose instructions are stored in instruction blocks 502B, 504B, and 506B. Each of blocks 500B-508B may also include the fields shown in FIG. 4, including a payload length, a payload (i.e., the instructions to be executed), a timestamp, a tag length, and a tag, as indicated by the ellipses.

Current block identifier 0x2345BCDE of start block 500B may indicate a start of a sequence of blocks. Previous block identifier 0x2345BCDE of first instruction block 502B may indicate the position of first instruction block 502B relative to start block 500B and may have the same value as the current block identifier stored in start block 500B. Similarly, previous block identifier 0x3456CDEF of second instruction block 504B may indicate the position of second instruction block 504B relative to first instruction block 502B and may have the same value as the current block identifier stored in first instruction block 502B.

If, after transmission to and reception by the remote computing device, the computed hash of first instruction block 502B matches the corresponding hash stored in second instruction block 504B (indicating that block 502B has not been modified or tampered with), the instructions stored in first instruction block 502B may be executed by the remote computing device. Otherwise, the remote computing device may take precautionary measures, including stopping execution of instructions in the chain of blocks 500B-508B, to avoid executing any malicious instructions that may have been injected into the remote computing device.

The same verification process may be performed with respect to second instruction block 504B and third instruction block 506B. Notably, end block 508A might not contain any instructions but may be used to verify third instruction block 506B. Contrary to the chaining approach illustrates in FIG. 5A, in the chaining approach illustrated in FIG. 5B, the instructions contained in a given instruction block cannot be executed until a subsequent block is used to validate the given instruction block. Additionally, in the implementation illustrated in FIG. 5B, a given block may store the hash value of a preceding block, rather than the hash value of a subsequent block as was the case in FIGS. 3A and 5A.

VIII. EXAMPLE BLOCK VERIFICATION MODULE

Figure 6:
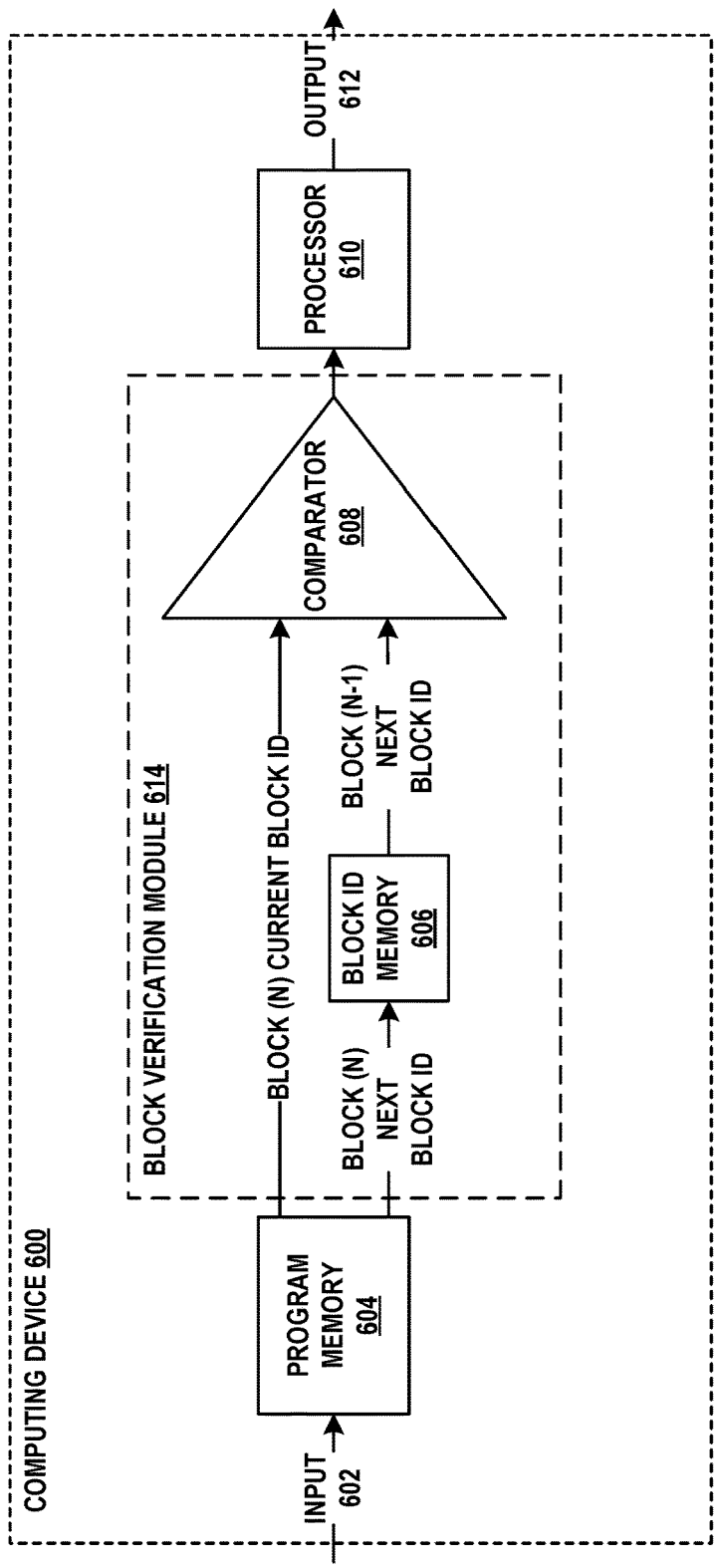
FIG. 6 illustrates a block verification module, in accordance with example embodiments.

FIG. 6 illustrates an example implementation of a block verification module that may be used by the remote computing device to verify that a block has not been tampered with or modified after transmission from a trusted computing device. FIG. 6 illustrates computing device 600 (e.g., one of remote computing device(s) 202) having program memory 604, block verification module 614, and processor 610. Program memory 604 accepts as input 602 instructions to be executed by processor 610, which produces output 612. Block verification module 614 may be implemented as hardware, as software, or as a combination thereof. For example, block verification module 614 may be implemented as an extension of an operating system of a computing device, thus allowing the computing device to verify chained instructions without any modifications of the general-purpose hardware of the computing device. However, block verification module 614 may also be implemented as part of a purpose-built processor or as a co-processor.

Block verification module 614 may include block identifier memory 606 and comparator 608. Block identifier memory 606 may receive at its input the next block identifier of block N and may produce at its output the next block identifier of block N–1 (i.e., the block preceding block N). Block identifier memory 606 therefore operates as a time delay for the next block identifier of consecutive blocks in a chain. A first input to comparator 608 includes a current block identifier of block N and a second input to comparator 608 includes a next block identifier of block N–1 (i.e., the output of block identifier memory 606). Comparator 608 compares the current block identifier of block N to a next block identifier of block N–1 When these identifiers match, comparator 608 passes block N to processor 610 for execution. When these identifiers do not match, block verification module 614 may search for another instruction block to execute or comparator 608 may pass to processor 610 instructions that reduce the possibility of processor 610 executing potentially-malicious instructions. For example, processor 610 may be caused to jump to an area of memory containing trusted instructions.

Notably, the block verification module illustrated in FIG. 6 is adapted to unchain blocks chained in the manner shown in FIG. 5A. Block verification module 614 may be adapted to unchain blocks chained in the manner shown in FIG. 5B by using block identifier memory 606 to delay the current block identifier of block N and passing the previous block identifier of block N directly to the comparator. Additionally, the hash values of blocks may be calculated by processor 610 or by a dedicated module (not shown) within block verification module 614.

IX. EXAMPLE PARTITIONING OF A SOFTWARE APPLICATION

Figure 7:
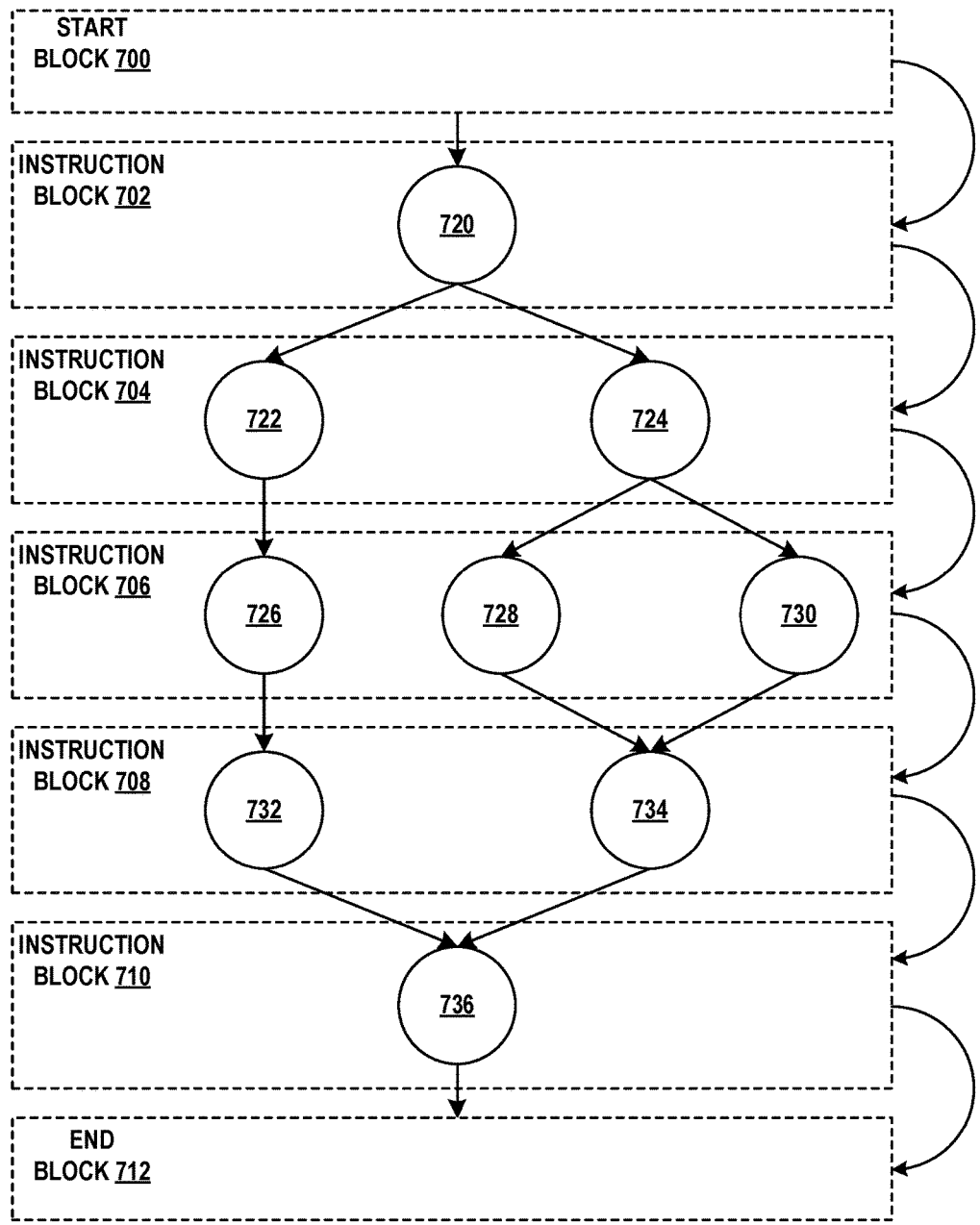
FIG. 7 illustrates a software application partitioned into blocks, in accordance with example embodiments.

FIG. 7 illustrates an example partitioning of a software application into a plurality of blocks. The software application may include code units 720, 722, 724, 726, 728, 730, 732, 734, and 736 (i.e., code units 720-736). Code units 720-736 may each represent one or more instructions to be carried out by a remote computing device (e.g., one of remote computing device(s) 202). For example, code units 720-736 may represent individual binary instructions, groups of binary instructions, interpreted instructions, functions, methods, classes, or other types of software constructs.

Trusted computing device(s) 200 may be configured to partition the software application such that it can be transmitted to remote computing device(s) 202 in a sequential chain of linked blocks 700, 702, 704, 706, 708, 710, and 712 (i.e., blocks 700-712). To that end, code unit 720, which includes a branch instruction, may be placed into instruction block 702. Code units 722 and 724, representing the possible paths resulting from taking and not taking the branch in code unit 720, may both be placed in instruction block 704. Thus, regardless of whether the branch in a code unit is taken or not taken, the subsequent instruction block may contain code units for handling both possibilities. Similarly, code units 728 and 730, representing the possible paths resulting from taking or not taking the branch in code unit 724, may both be stored in instruction block 706.

For example, code unit 720 may include instructions for checking whether a user account associated with the software application exists. If the user account exists, the software application may proceed to code unit 724. If the user account does not exist, the software application may generate an error that gets passed through the software application. Each of instruction blocks 704, 706, 708, and 710 may include code units 722, 726, 732, and 736, respectively, for handling the error (e.g., passing the error on through to end block 712). Alternatively, the generated error may cause the computing device to terminate execution of the chain without needing to execute each of instruction blocks 704, 706, 708, 710, and end block 712.

Code unit 724, executed if the user account exists, may include instructions for determining a manner in which to calculate a value (e.g., using a first equation or a second different equation) based on inputs provided to the software application at runtime. Instruction block 706 may thus be arranged to contain instructions for calculating the value using both the first equation and the second equation. Depending on the branch result in code unit 724 at runtime, either code unit 728 or 730 may be executed at runtime. However, both code unit 728 and code unit 730 may be contained and available for execution in instruction block 706. Once the value is calculated, code units 728 and 730 may converge to code unit 734 in instruction block 708 which may include, for example, instructions to display the calculated value. Similarly, code units 732 and 734 may converge to code unit 736 in instruction block 710 which may include, for example, instructions to display a confirmation of success or failure of the operations of the software application.

In some implementations, software loops may be handled by storing all of the code within the loop in a single instruction block. This way, the chain of blocks may be organized as a linear sequence between the start and end blocks without any blocks looping back to earlier blocks. However, in other implementations, the structure of the chain of blocks may also be non-linear and may include branching blocks. Portions of the code within a loop may thus be partitioned into different blocks, with some of the blocks being chained back to earlier blocks to allow for functionality of the loop.

Branches may thus be handled by including the branch taken and the branch not taken paths in different instruction blocks. The instruction block containing the branch instruction may thus include two next block identifiers, one identifier corresponding to the instruction block to be executed if the branch is taken, and another identifier corresponding to the instruction block to be executed if the branch is not taken. The instructions contained in a subsequent instruction block may be executed when the current block identifier of the subsequent block matches one of the next block identifiers stored in the preceding block.

Thus, for example, rather than using the linear arrangement of instruction blocks 702-710, to contain code units 720-736, each of code units 720-736 may be partitioned into its own block. Code unit 720, now stored as a block, may be chained to each of code units 722 and 724, also stored as individual blocks. The remote computing device may thus be configured to treat both block 722 and block 724 as valid successors to block 720. To that end, both blocks 722 and 724 may, for example, use the same current block identifier. Alternatively, block 720 may store two next block identifiers, one for each of blocks 722 and 724. Similarly, code unit 724, now stored as a block, may be chained to each of code units 728 and 730, also stored as individual blocks. The remote computing device may thus be configured to treat both block 728 and block 730 as valid successors to block 724.

X. ADDITIONAL EXAMPLE OPERATIONS

Figure 8:
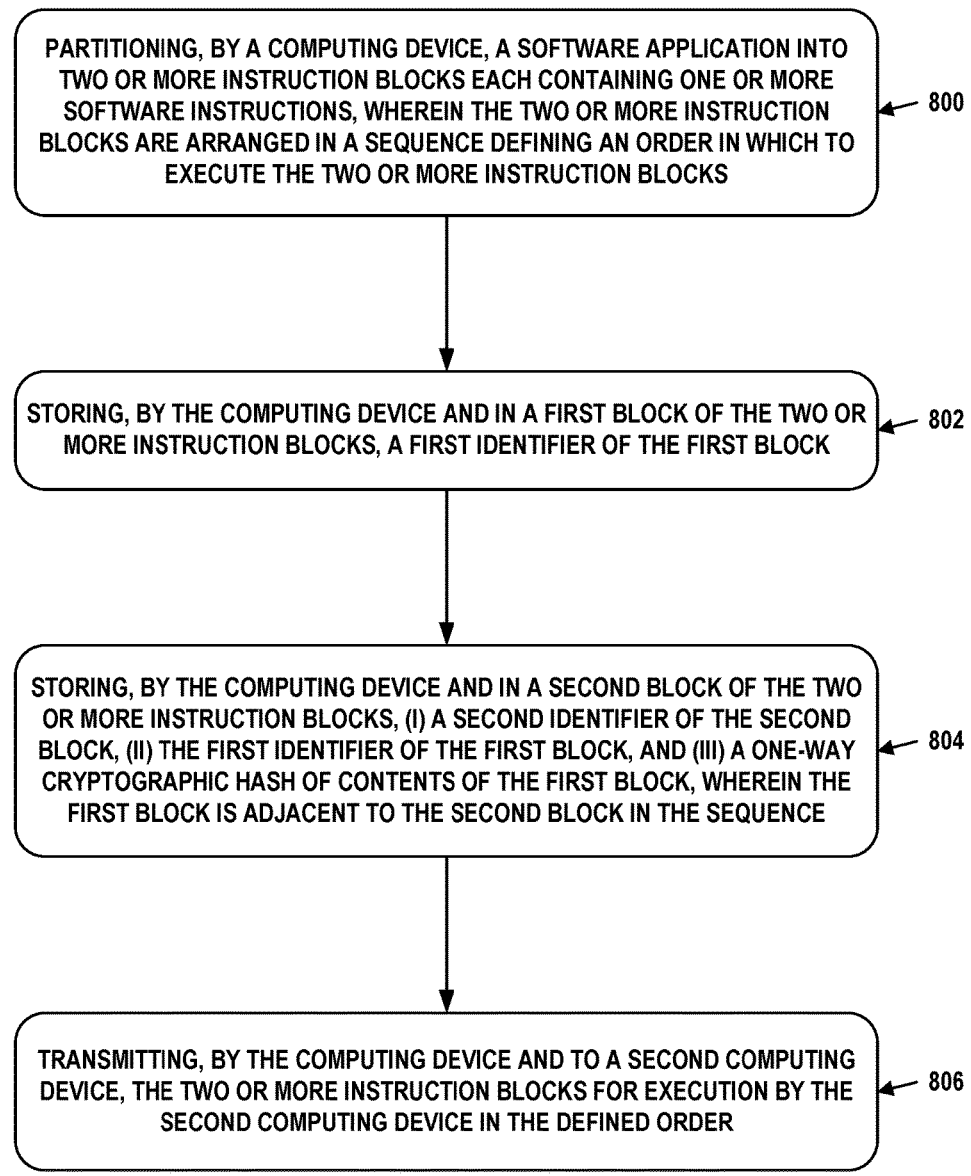
FIG. 8 illustrates a flow chart, in accordance with example embodiments.

FIG. 8 is a flow chart illustrating an example embodiment. The operations shown in FIG. 8 may be carried out by computing device 100, trusted computing device(s) 200, or remote computing device(s), among other possibilities. For example, the operations shown in FIG. 8 may be carried out by trusted computing device(s) 200 operating in coordination with remote computing device(s) 202. In another example, the operations may be carried out by one or more of remote computing device(s) 202 operating in coordination with one or more other remote computing devices of remote computing device(s) 202. The embodiments of FIG. 8 may be simplified by the removal of any one or more of the features shown therein. Further, these embodiments may be combined with features, aspects, and/or implementations of any of the previous figures or otherwise described herein.

Block 800 may involve partitioning, by a computing device, a software application into two or more instruction blocks each containing one or more software instructions. The two or more instruction blocks may be arranged in a sequence defining an order in which to execute the two or more instruction blocks.

Block 802 may involve storing, by the computing device and in a first block of the two or more instruction blocks, a first identifier of the first block.

Block 804 may involve storing, by the computing device and in a second block of the two or more instruction blocks, (i) a second identifier of the second block, (ii) the first identifier of the first block, and (iii) a one-way cryptographic hash of contents of the first block. The first block may be adjacent to the second block in the sequence.

Block 806 may involve transmitting, by the computing device and to a second computing device, the two or more instruction blocks for execution by the second computing device in the defined order. The second computing device may be one of remote computing device(s) 202.

In some embodiments, the two or more instruction blocks may include three or more instruction blocks. The computing device may store, in a third block of the three or more instruction blocks, (i) a third identifier of the third block, (ii) the second identifier of the second block, and (iii) a one-way cryptographic hash of contents of the second block. The third block may be adjacent to the second block.

In some embodiments, the two or more instruction blocks may be configured to be executed by the second computing device in an unbroken sequence defined by the order.

In some embodiments, a plurality of software applications to be executed by the second computing device may be determined. The plurality of software applications may include the software application. For each respective software application of the plurality of software applications, (i) an expected number of blocks into which the respective software application is partitioned and (ii) an expected cryptographic hash calculated over the respective software application may be determined. For each respective software application and prior to execution thereof by the second computing device, the expected number of blocks and the expected cryptographic hash may be transmitted to the second computing device. Reception of the expected number of blocks and the expected cryptographic hash may configure the second computing device to permit execution of the respective software application when, after reception by the computing device, the respective software application has the expected number of blocks and the expected cryptographic hash.

In some embodiments, the expected number of blocks and the expected cryptographic hash for each respective software application may be transmitted to the second computing device prior to deployment of the second computing device.

In some embodiments, the second block may be a block subsequent to the first block in the sequence.

In some embodiments, the second block may be a block preceding the first block in the sequence.

In some embodiments, partitioning the software application includes identifying a branch condition in the software application, storing the branch condition in the second block, and storing, in the first block, (i) first instructions to be executed when the branch condition is satisfied and (ii) second instructions to be executed when the branch condition is not satisfied.

In some embodiments, partitioning the software application includes identifying a branch condition in the software application, storing, in the second block, (i) the branch condition, (ii) first instructions to be executed when the branch condition is satisfied, and (iii) second instructions to be executed when the branch condition is not satisfied, and storing, in the first block, instructions to be executed after the first instructions and after the second instructions.

In some embodiments, the first identifier may include the one-way cryptographic hash of the contents of the first block. The second identifier may include a one-way cryptographic hash of contents of the second block. The contents of the second block include the first block identifier of the first block.

In some embodiments, the first identifier includes a first random key assigned to the first block and the second identifier includes a second random key assigned to the second block.

In some embodiments, the first identifier includes at least one of the one or more software instructions contained in the first block and the second identifier may include at least one of the one or more software instructions contained in the second block.

In some embodiments, an application identifier may be assigned to the software application. Each block of the two or more instruction blocks may be associated with the application identifier. The application identifier may be transmitted to the second computing device prior to execution of the software application by the second computing device. Reception of the application identifier may configure the second computing device to execute instructions contained in blocks associated with the application identifier.

In some embodiments, a start identifier for a start block may be determined. The start block may be appended at a beginning of the sequence of the two or more instruction blocks before transmission thereof to the second computing device. The start identifier may be transmitted to the second computing device prior to transmission of the two or more instruction blocks to the second computing device. Reception of the start identifier configures the second computing device to execute instructions contained in the two or more instruction blocks when the start block received by the second computing device contains the start identifier.

Figure 9:
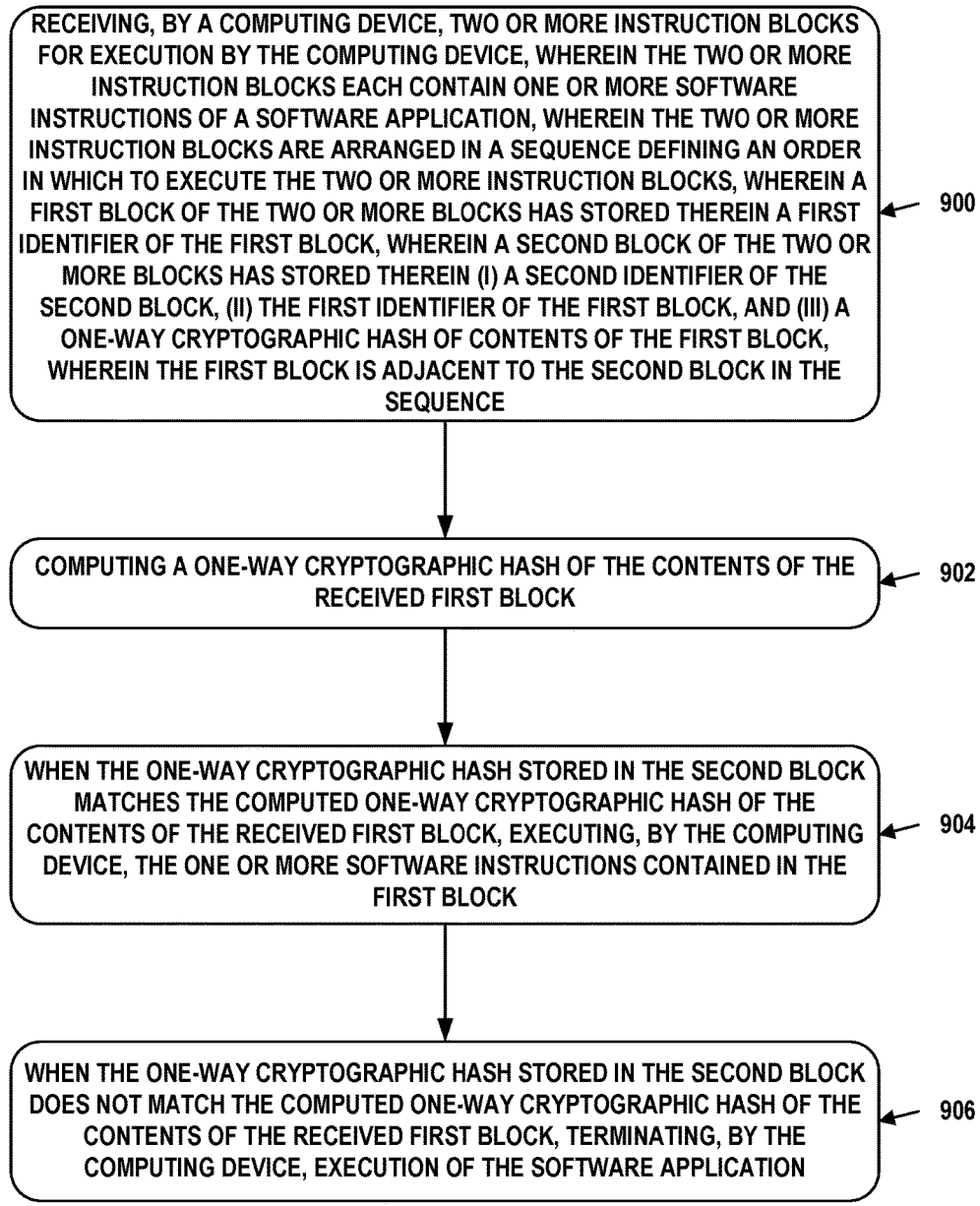
FIG. 9 illustrates a flow chart, in accordance with example embodiments.

FIG. 9 is a flow chart illustrating an example embodiment. The operations shown in FIG. 9 may be carried out by computing device 100, remote computing device(s) 202, or the second computing device referred to with respect to FIG. 8, among other possibilities. For example, the operations shown in FIG. 9 may be carried out by remote computing device(s) 202 operating in coordination with trusted computing device(s) 200. In another example, the operations may be carried out by one or more of remote computing device(s) 202 operating in coordination with one or more other remote computing devices of remote computing device(s) 202. The embodiments of FIG. 9 may be simplified by the removal of any one or more of the features shown therein. Further, these embodiments may be combined with features, aspects, and/or implementations of any of the previous figures (e.g., FIG. 8) or otherwise described herein.

Block 900 may involve receiving, by a computing device, two or more instruction blocks for execution by the computing device. The two or more instruction blocks may each contain one or more software instructions of a software application. The two or more instruction blocks may be arranged in a sequence defining an order in which to execute the two or more instruction blocks. A first block of the two or more blocks may have stored therein a first identifier of the first block. A second block of the two or more blocks may have stored therein (i) a second identifier of the second block, (ii) the first identifier of the first block, and (iii) a one-way cryptographic hash of contents of the first block. The first block may be adjacent to the second block in the sequence. The two or more instruction blocks may be received from trusted computing device(s) 200.

Block 902 may involve computing a one-way cryptographic hash of the contents of the received first block. The computed one-way cryptographic hash of the contents of the received first block may be different from the one-way cryptographic hash stored in the second block if the first block was modified after transmission or reception. Thus, comparing the computed one-way cryptographic hash to the one-way cryptographic hash stored in the second block may allow for detection of potentially-malicious changes to the contents of the first block.

Block 904 may involve, when the one-way cryptographic hash stored in the second block matches the computed one-way cryptographic hash of the contents of the received first block, executing, by the computing device, the one or more software instructions contained in the first block.

Block 906 may involve, when the one-way cryptographic hash stored in the second block does not match the computed one-way cryptographic hash of the contents of the received first block, terminating, by the computing device, execution of the software application.

In some embodiments, the two or more instruction blocks may include three or more instruction blocks. A third block of the three or more instruction blocks may have stored therein (i) a third identifier of the third block, (ii) the second identifier of the second block, and (iii) a one-way cryptographic hash of contents of the second block. The third block may be adjacent to the second block. A one-way cryptographic hash of the contents of the received second block may be computed. When the one-way cryptographic hash stored in the third block matches the computed one-way cryptographic hash of the contents of the received second block, the one or more software instructions contained in the second block may be executed. When the one-way cryptographic hash stored in the third block does not match the computed one-way cryptographic hash of the contents of the received second block, execution of the software application may be terminated.

In some embodiments, the computing device may be configured to execute the two or more instruction blocks in an unbroken sequence defined by the order.

In some embodiments, the second block may be a block preceding the first block in the sequence.

In some embodiments, the second block may be a block subsequent to the first block in the sequence.

In some embodiments, the first identifier may include the one-way cryptographic hash of the contents of the first block and the second identifier may include a one-way cryptographic hash of contents of the second block. The contents of the second block may include the first block identifier of the first block.

XI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules (including firmware modules) and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:
1. A method comprising:
   partitioning, by a computing device, a software application into two or more instruction blocks each containing one or more software instructions, wherein the two or more instruction blocks are arranged in a sequence defining an order in which to execute the two or more instruction blocks;
   storing, by the computing device and in a first block of the two or more instruction blocks, a first identifier of the first block;

storing, by the computing device and in a second block of the two or more instruction blocks, (i) a second identifier of the second block, (ii) the first identifier of the first block, and (iii) a one-way cryptographic hash of contents of the first block, wherein the first block is adjacent to the second block in the sequence; and transmitting, by the computing device and to a second computing device, the two or more instruction blocks for execution by the second computing device in the defined order, wherein the two or more instruction blocks are configured to be executed by the second computing device in an unbroken sequence defined by the order.

2. The method of claim 1, wherein the two or more instruction blocks comprise three or more instruction blocks, and wherein the method further comprises:

storing, in a third block of the three or more instruction blocks, (i) a third identifier of the third block, (ii) the second identifier of the second block, and (iii) a one-way cryptographic hash of contents of the second block, wherein the third block is adjacent to the second block.

3. The method of claim 1, further comprising:

determining a plurality of software applications to be executed by the second computing device, wherein the plurality of software applications includes the software application;

for each respective software application of the plurality of software applications, determining (i) an expected number of blocks into which the respective software application is partitioned and (ii) an expected cryptographic hash calculated over the respective software application; and transmitting, to the second computing device, for each respective software application and prior to execution thereof by the second computing device, the expected number of blocks and the expected cryptographic hash, wherein reception of the expected number of blocks and the expected cryptographic hash configures the second computing device to permit execution of the respective software application when, after reception by the computing device, the respective software application has the expected number of blocks and the expected cryptographic hash.

4. The method of claim 3, wherein the expected number of blocks and the expected cryptographic hash for each respective software application are transmitted to the second computing device prior to deployment of the second computing device.

5. The method of claim 1, wherein the second block is a block subsequent to the first block in the sequence.

6. The method of claim 1, wherein the second block is a block preceding the first block in the sequence.

7. The method of claim 6, wherein partitioning the software application comprises:

identifying a branch condition in the software application;
storing the branch condition in the second block; and
storing, in the first block, (i) first instructions to be executed when the branch condition is satisfied and (ii) second instructions to be executed when the branch condition is not satisfied.

8. The method of claim 6, wherein partitioning the software application comprises:

identifying a branch condition in the software application;
storing, in the second block, (i) the branch condition, (ii) first instructions to be executed when the branch condition is satisfied, and (iii) second instructions to be executed when the branch condition is not satisfied; and
storing, in the first block, instructions to be executed after the first instructions and after the second instructions.

9. The method of claim 1, wherein:

the first identifier comprises the one-way cryptographic hash of the contents of the first block; and
the second identifier comprises a one-way cryptographic hash of contents of the second block, wherein the contents of the second block include the first identifier of the first block.

10. The method of claim 1, wherein:

the first identifier comprises a first random key assigned to the first block; and
the second identifier comprises a second random key assigned to the second block.

11. The method of claim 1, wherein:

the first identifier comprises at least one of the one or more software instructions contained in the first block; and
the second identifier comprises at least one of the one or more software instructions contained in the second block.

12. The method of claim 1, further comprising:

assigning an application identifier to the software application;
associating each block of the two or more instruction blocks with the application identifier; and
transmitting the application identifier to the second computing device prior to execution of the software application by the second computing device, wherein reception of the application identifier configures the second computing device to execute instructions contained in blocks associated with the application identifier.

13. The method of claim 1, further comprising:

determining a start identifier for a start block, wherein the start block is appended at a beginning of the sequence of the two or more instruction blocks before transmission thereof to the second computing device; and
transmitting the start identifier to the second computing device prior to transmission of the two or more instruction blocks to the second computing device, wherein reception of the start identifier configures the second computing device to execute instructions contained in the two or more instruction blocks when the start block received by the second computing device contains the start identifier.

14. A non-transitory computer-readable storage medium having stored thereon instructions that, when executed by a computing device, cause the computing device to perform operations comprising:

partitioning a software application into two or more instruction blocks each containing one or more software instructions, wherein the two or more instruction blocks are arranged in a sequence defining an order in which to execute the two or more instruction blocks;
storing, in a first block of the two or more instruction blocks, a first identifier of the first block;
storing, in a second block of the two or more instruction blocks, (i) a second identifier of the second block, (ii) the first identifier of the first block, and (iii) a one-way cryptographic hash of contents of the first block, wherein the first block is adjacent to the second block in the sequence; and
transmitting, by the computing device and to a second computing device, the two or more instruction blocks for execution of the instructions contained therein by the second computing device, wherein the two or more instruction blocks are configured to be executed by the second computing device in an unbroken sequence defined by the order.

15. The non-transitory computer-readable storage medium of claim 14, wherein the operations further comprise:
determining a plurality of software applications to be executed by the second computing device, wherein the plurality of software applications includes the software application;
for each respective software application of the plurality of software applications, determining (i) an expected number of blocks into which the respective software application is partitioned and (ii) an expected cryptographic hash calculated over the respective software application; and
transmitting, to the second computing device, for each respective software application and prior to execution thereof by the second computing device, the expected number of blocks and the expected cryptographic hash,
wherein reception of the expected number of blocks and the expected cryptographic hash configures the second computing device to permit execution of the respective software application when, after reception by the computing device, the respective software application has the expected number of blocks and the expected cryptographic hash.

16. The non-transitory computer-readable storage medium of claim 14, wherein:
the first identifier comprises the one-way cryptographic hash of the contents of the first block; and
the second identifier comprises a one-way cryptographic hash of contents of the second block, wherein the contents of the second block include the first identifier of the first block.

17. A method comprising:
receiving, by a computing device, two or more instruction blocks for execution by the computing device, wherein the two or more instruction blocks each contain one or more software instructions of a software application, wherein the two or more instruction blocks are arranged in a sequence defining an order in which to execute the two or more instruction blocks, wherein the computing device is configured to execute the two or more instruction blocks in an unbroken sequence defined by the order, wherein a first block of the two or more instruction blocks has stored therein a first identifier of the first block, wherein a second block of the two or more instruction blocks has stored therein (i) a second identifier of the second block, (ii) the first identifier of the first block, and (iii) a one-way cryptographic hash of contents of the first block, wherein the first block is adjacent to the second block in the sequence;
computing a one-way cryptographic hash of the contents of the received first block;
when the one-way cryptographic hash stored in the second block matches the computed one-way cryptographic hash of the contents of the received first block, executing, by the computing device, the one or more software instructions contained in the first block; and
when the one-way cryptographic hash stored in the second block does not match the computed one-way cryptographic hash of the contents of the received first block, terminating, by the computing device, execution of the software application.

18. The method of claim 17, wherein the two or more instruction blocks comprise three or more instruction blocks, wherein a third block of the three or more instruction blocks has stored therein (i) a third identifier of the third block, (ii) the second identifier of the second block, and (iii) a one-way cryptographic hash of contents of the second block, wherein the third block is adjacent to the second block, and wherein the method further comprises:
computing a one-way cryptographic hash of the contents of the received second block;
when the one-way cryptographic hash stored in the third block matches the computed one-way cryptographic hash of the contents of the received second block, executing the one or more software instructions contained in the second block; and
when the one-way cryptographic hash stored in the third block does not match the computed one-way cryptographic hash of the contents of the received second block, terminating execution of the software application.

19. The method of claim 17, further comprising:
receiving, for each respective software application of a plurality of software applications and prior to execution thereof by the computing device, (i) an expected number of blocks into which the respective software application is partitioned and (ii) an expected cryptographic hash calculated over the respective software application, wherein the plurality of software applications includes the software application; and
in response to receiving, for each respective software application, the expected number of blocks and the expected cryptographic hash, configuring the computing device to permit execution of the respective software application when, after reception by the computing device, the respective software application has the expected number of blocks and the expected cryptographic hash.

20. The method of claim 14, wherein:
the first identifier comprises the one-way cryptographic hash of the contents of the first block; and
the second identifier comprises a one-way cryptographic hash of contents of the second block, wherein the contents of the second block include the first identifier of the first block.

* * * * *